US008743756B2

(12) United States Patent
Uyehara et al.

(10) Patent No.: US 8,743,756 B2
(45) Date of Patent: **\*Jun. 3, 2014**

(54) DISTINCT TRANSPORT PATH FOR MIMO TRANSMISSIONS IN DISTRIBUTED ANTENNA SYSTEMS

(71) Applicant: ADC Telecommunications, Inc., Shakopee, MN (US)

(72) Inventors: Lance K. Uyehara, San Jose, CA (US); David Hart, Sunnyvale, CA (US); Dean Zavadsky, Shakopee, MN (US); Larry G. Fischer, Waseca, MN (US)

(73) Assignee: ADC Telecommunications, Inc., Shakopee, MN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/914,690

(22) Filed: Jun. 11, 2013

(65) Prior Publication Data

US 2013/0272441 A1   Oct. 17, 2013

Related U.S. Application Data

(63) Continuation of application No. 13/004,998, filed on Jan. 12, 2011, now Pat. No. 8,462,683.

(51) Int. Cl.
*H04B 7/00* (2006.01)

(52) U.S. Cl.
USPC ............ 370/310; 370/345; 370/252; 370/464

(58) Field of Classification Search
CPC ..... H04W 24/00; H04W 84/18; H04W 84/12; H04W 72/04; H04W 88/08; H04W 76/00; H04W 72/0446; H04W 36/18; H04W 36/14; H04W 36/08; H04W 88/06; H04W 43/08; H04L 43/50; H04L 43/0852; H04L 5/003
USPC ......... 370/252, 319, 320, 321, 326, 329, 330, 370/334, 335, 336, 339, 341, 342, 343, 344, 370/431, 464, 345, 338, 310; 375/259, 356
See application file for complete search history.

(56) References Cited

U.S. PATENT DOCUMENTS

| 4,183,054 A | 1/1980 | Patisaul et al. |
| 4,451,916 A | 5/1984 | Casper et al. |

(Continued)

FOREIGN PATENT DOCUMENTS

| CA | 2058736 | 7/1993 |
| CA | 2058737 | 7/1993 |

(Continued)

OTHER PUBLICATIONS

U.S. Patent and Trademark Office, "Decision on Appeal", "U.S. Appl. No. 11/150,820", Nov. 19, 2012, pp. 1-6.

(Continued)

*Primary Examiner* — Abdullah Riyami
(74) *Attorney, Agent, or Firm* — Fogg & Powers LLC

(57) ABSTRACT

A hybrid expansion unit includes at least one digital communication interface adapted to communicate first and second sets of N-bit words of digitized spectrum with an upstream device. The hybrid expansion unit further includes at least one analog communication interface adapted to communicate first and second sets of bands of analog spectrum with a downstream device. The hybrid expansion unit is adapted to convert between the first set of N-bit words of digitized spectrum and the first set of bands of analog spectrum. The hybrid expansion unit is further adapted to convert between the second set of N-bit words of digitized spectrum and the second set of bands of analog spectrum. The first set of bands of analog spectrum occupy a first frequency range and the second set of bands of analog spectrum occupy a second frequency range. The first frequency range and the second frequency range do not overlap.

37 Claims, 14 Drawing Sheets

(56) References Cited

U.S. PATENT DOCUMENTS

| | | | |
|---|---|---|---|
| 4,611,323 | A | 9/1986 | Hessenmuller |
| 4,628,501 | A | 12/1986 | Loscoe |
| 4,654,843 | A | 3/1987 | Roza et al. |
| 4,691,292 | A | 9/1987 | Rothweiler |
| 4,999,831 | A | 3/1991 | Grace |
| 5,193,109 | A | 3/1993 | Lee |
| 5,243,598 | A | 9/1993 | Lee |
| 5,303,287 | A | 4/1994 | Laborde |
| 5,321,736 | A | 6/1994 | Beasley |
| 5,321,849 | A | 6/1994 | Lemson |
| 5,339,184 | A | 8/1994 | Tang |
| 5,377,255 | A | 12/1994 | Beasley |
| 5,381,459 | A | 1/1995 | Lappington |
| 5,400,391 | A | 3/1995 | Emura et al. |
| 5,461,627 | A | 10/1995 | Rypinski |
| 5,519,691 | A | 5/1996 | Darcie et al. |
| 5,545,397 | A | 8/1996 | Spielvogel et al. |
| 5,566,168 | A | 10/1996 | Dent |
| 5,621,786 | A | 4/1997 | Fischer et al. |
| 5,627,879 | A | 5/1997 | Russell et al. |
| 5,634,191 | A | 5/1997 | Beasley |
| 5,642,405 | A | 6/1997 | Fischer et al. |
| 5,644,622 | A | 7/1997 | Russell et al. |
| 5,657,374 | A | 8/1997 | Russell et al. |
| 5,678,177 | A | 10/1997 | Beasley |
| 5,682,256 | A | 10/1997 | Motley et al. |
| 5,687,195 | A | 11/1997 | Hwang et al. |
| 5,732,076 | A | 3/1998 | Ketseoglou et al. |
| 5,761,619 | A | 6/1998 | Danne et al. |
| 5,765,099 | A | 6/1998 | Georges et al. |
| 5,781,541 | A | 7/1998 | Schneider |
| 5,781,859 | A | 7/1998 | Beasley |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,822,324 | A | 10/1998 | Kostresti et al. |
| 5,845,199 | A | 12/1998 | Longshore |
| 5,852,651 | A | 12/1998 | Fischer et al. |
| 5,867,485 | A | 2/1999 | Chambers et al. |
| 5,870,392 | A | 2/1999 | Ann |
| 5,890,055 | A | 3/1999 | Chu et al. |
| 5,907,544 | A | 5/1999 | Rypinski |
| 5,924,022 | A | 7/1999 | Beasley et al. |
| 5,987,014 | A | 11/1999 | Magill et al. |
| 6,023,628 | A | 2/2000 | Beasley |
| 6,034,950 | A | 3/2000 | Sauer et al. |
| 6,108,113 | A | 8/2000 | Fee |
| 6,108,550 | A | 8/2000 | Wiorek et al. |
| 6,108,626 | A | 8/2000 | Cellario et al. |
| 6,157,659 | A | 12/2000 | Bird |
| 6,157,810 | A | 12/2000 | Georges et al. |
| 6,188,693 | B1 | 2/2001 | Murakami |
| 6,222,660 | B1 | 4/2001 | Traa |
| 6,226,274 | B1 | 5/2001 | Reese et al. |
| 6,246,675 | B1 | 6/2001 | Beasley et al. |
| 6,373,887 | B1 | 4/2002 | Aiyagari et al. |
| 6,377,640 | B2 | 4/2002 | Trans |
| 6,498,936 | B1 | 12/2002 | Raith |
| 6,567,473 | B1 | 5/2003 | Tzannes |
| 6,667,973 | B1 | 12/2003 | Gorshe et al. |
| 6,674,966 | B1 | 1/2004 | Koonen |
| 6,704,545 | B1 | 3/2004 | Wala |
| 6,729,929 | B1 | 5/2004 | Sayers et al. |
| 6,768,745 | B1 | 7/2004 | Gorshe et al. |
| 6,785,558 | B1 | 8/2004 | Stratford et al. |
| 6,826,163 | B2 | 11/2004 | Mani et al. |
| 6,826,164 | B2 | 11/2004 | Mani et al. |
| 6,831,901 | B2 | 12/2004 | Millar |
| 6,865,390 | B2 | 3/2005 | Goss et al. |
| 6,917,614 | B1 | 7/2005 | Laubach et al. |
| 6,963,552 | B2 | 11/2005 | Sabat, Jr. et al. |
| 7,127,175 | B2 | 10/2006 | Mani et al. |
| 7,205,864 | B2 | 4/2007 | Schultz, Jr. et al. |
| 7,215,651 | B2 | 5/2007 | Millar |
| 7,289,972 | B2 | 10/2007 | Rieser et al. |
| 7,313,415 | B2 | 12/2007 | Wake et al. |
| 7,733,901 | B2 | 6/2010 | Salkini et al. |
| 7,761,093 | B2 | 7/2010 | Sabat, Jr. et al. |
| 7,920,858 | B2 | 4/2011 | Sabat, Jr. et al. |
| 2001/0036163 | A1 | 11/2001 | Sabat, Jr. et al. |
| 2001/0044292 | A1 | 11/2001 | Jeon et al. |
| 2002/0142739 | A1 | 10/2002 | Smith |
| 2002/0167954 | A1 | 11/2002 | Highsmith et al. |
| 2002/0191565 | A1 | 12/2002 | Mani et al. |
| 2003/0015943 | A1 | 1/2003 | Kim et al. |
| 2003/0043928 | A1 | 3/2003 | Ling et al. |
| 2003/0203717 | A1 | 10/2003 | Chuprun et al. |
| 2004/0010609 | A1 | 1/2004 | Vilander et al. |
| 2004/0032354 | A1 | 2/2004 | Knobel et al. |
| 2004/0037565 | A1 | 2/2004 | Young et al. |
| 2004/0053602 | A1 | 3/2004 | Wurzburg |
| 2004/0106387 | A1 | 6/2004 | Bauman et al. |
| 2004/0106435 | A1 | 6/2004 | Bauman et al. |
| 2004/0132474 | A1 | 7/2004 | Wala |
| 2004/0198453 | A1 | 10/2004 | Cutrer et al. |
| 2004/0203339 | A1 | 10/2004 | Bauman |
| 2004/0203703 | A1 | 10/2004 | Fischer |
| 2004/0219950 | A1 | 11/2004 | Pallonen et al. |
| 2005/0147067 | A1 | 7/2005 | Mani et al. |
| 2005/0201323 | A1 | 9/2005 | Mani et al. |
| 2005/0250503 | A1 | 11/2005 | Cutrer |
| 2006/0066484 | A1 | 3/2006 | Sayers |
| 2006/0094470 | A1 | 5/2006 | Wake et al. |
| 2006/0121944 | A1 | 6/2006 | Buscaglia et al. |
| 2006/0153070 | A1 | 7/2006 | DelRegno et al. |
| 2006/0172775 | A1 | 8/2006 | Conyers et al. |
| 2006/0193295 | A1 | 8/2006 | White et al. |
| 2007/0008939 | A1* | 1/2007 | Fischer .......... 370/338 |
| 2010/0208673 | A1* | 8/2010 | Nam et al. .......... 370/329 |
| 2010/0215028 | A1 | 8/2010 | Fischer |
| 2011/0143649 | A1 | 6/2011 | Sabat, Jr. et al. |
| 2012/0027145 | A1* | 2/2012 | Uyehara et al. .......... 375/356 |
| 2012/0106657 | A1* | 5/2012 | Fischer et al. .......... 375/259 |

FOREIGN PATENT DOCUMENTS

| | | |
|---|---|---|
| CA | 2069462 | 7/1993 |
| CA | 2087285 | 1/1994 |
| CA | 2138763 | 1/1994 |
| CA | 2156046 | 1/1995 |
| CA | 2125411 | 5/1995 |
| CA | 2128842 | 1/1996 |
| CA | 2134365 | 4/1996 |
| CA | 2158386 | 3/1997 |
| CA | 2168681 | 8/1997 |
| CA | 2215079 | 3/1999 |
| EP | 0391597 | 10/1990 |
| EP | 0876073 | 11/1998 |
| EP | 1214809 | 3/2006 |
| GB | 2253770 | 9/1992 |
| GB | 2289198 | 11/1995 |
| GB | 2315959 | 2/1998 |
| GB | 2320653 | 6/1998 |
| JP | 2000333240 | 11/2000 |
| JP | 2001197012 | 7/2001 |
| JP | 2003023396 | 1/2003 |
| JP | 2001180220 | 6/2004 |
| JP | 2004194351 | 7/2004 |
| WO | 9115927 | 10/1991 |
| WO | 9413067 | 6/1994 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0117156 | 3/2001 |
| WO | 0174013 | 10/2001 |
| WO | 0174100 | 10/2001 |

(56) References Cited

FOREIGN PATENT DOCUMENTS

| WO | 0182642 | 11/2001 |
| WO | 03079645 | 9/2003 |

OTHER PUBLICATIONS

U.S. Patent and Trademark Office, "Examiner's Answer", "U.S. Appl. No. 11/150,820", Nov. 17, 2009, pp. 1-24.
U.S. Patent and Trademark Office, "Final Office Action", "U.S. Appl. No. 11/150,820", Sep. 27, 2007, pp. 1-25.
U.S. Patent and Trademark Office, "Final Office Action", "U.S. Appl. No. 11/150,820", Dec. 29, 2008, pp. 1-27.
U.S. Patent and Trademark Office, "Office Action", "U.S. Appl. No. 11/150,820", Mar. 16, 2007, pp. 1-21.
U.S. Patent and Trademark Office, "Office Action", "U.S. Appl. No. 11/150,820", Mar. 24, 2008, pp. 1-17.
U.S. Patent and Trademark Office, "Examiner's Answer", "U.S. Appl. No. 12/775,897", Jan. 4, 2013, pp. 1-30.
U.S. Patent and Trademark Office, "Final Office Action", "U.S. Appl. No. 12/775,897", May 7, 2012, pp. 1-26.
U.S. Patent and Trademark Office, "Office Action", "U.S. Appl. No. 12/775,897", Dec. 28, 2011, pp. 1-29.
U.S. Patent and Trademark Office, "Pre-Appeal Brief Decision", "U.S. Appl. No. 12/775,897", Sep. 18, 2012, pp. 1-2.
International Preliminary Examining Authority, "International Preliminary Report on Patentability", "from Foreign Counterpart of U.S. Appl. No. 11/150,820", Dec. 27, 2007, pp. 1-9, Published in: WO.
International Searching Authority, "International Search Report", "from Foreign Counterpart of U.S. Appl. No. 11/150,820", Nov. 7, 2006, pp. 1-13, Published in: WO.
"DigivanceTM, Indoor Coverage Solution", "www.adc.com", 2001, pp. 1-8, Publisher: ADC.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
"Tektronix Synchronous Optical Network (SONET)", "http://www.iec.org/online/tutorials/sonet/topic03.html", Aug. 28, 2002, Publisher: International Engineering Consortium.
U.S. Patent and Trademark Office, "Notice of Allowance", "U.S. Appl. No. 12/845,060", Mar. 4, 2013, pp. 1-10.
U.S. Patent and Trademark Office, "Corrected Notice of Allowability and Interview Summary", "U.S. Appl. No. 12/845,060", Mar. 28, 2013, pp. 1-25.
U.S. Patent and Trademark Office, "Office Action", "U.S. Appl. No. 12/845,060", Oct. 2, 2012, pp. 1-28.
International Preliminary Examining Authority, "International Preliminary Report on Patentability", "from Foreign Counterpart of U.S. Appl. No. 12/845,060", Feb. 7, 2013, pp. 1-6, Published in: WO.
International Searching Authority, "International Search Report", "from Foreign Counterpart of U.S. Appl. No. 12/845,060", Feb. 17, 2012, pp. 1-9, Published in: WO.
U.S. Patent and Trademark Office, "Notice of Allowance", "U.S. Appl. No. 13/004,998", May 3, 2013, pp. 1-26.
U.S. Patent and Trademark Office, "Office Action", "U.S. Appl. No. 13/004,998", Feb. 11, 2013, pp. 1-45.
International Preliminary Examining Authority, "International Preliminary Report on Patentability", "from Foreign Counterpart of U.S. Appl. No. 12/913,179", May 10, 2013, pp. 1-7, Published in: WO.
U.S. Patent and Trademark Office, "Office Action", "U.S. Appl. No. 12/913,179", Mar. 18, 2013, pp. 1-49.
International Searching Authority, "International Search Report and Written Opinion", "from Foreign Counterpart of U.S. Appl. No. 12/913,179", Feb. 17, 2012, pp. 1-10, Published in: WO.
Chinese Patent Office, "Notification to Grant Patent Right for Invention", "from Foreign Counterpart of U.S. Appl. No. 11/150,820", Mar. 2, 2012, pp. 1-4, Published in: CN.
Chinese Patent Office, "First Office Action", "from Foreign Counterpart of U.S. Appl. No. 11/150,820", Oct. 9, 2010, pp. 1-33, Published in: CN.
Chinese Patent Office, "Second Office Action", "from Foreign Counterpart of U.S. Appl. No. 11/150,820", Aug. 10, 2011, pp. 1-31, Published in: CN.
Chinese Patent Office, "Third Office Action", "from Foreign Counterpart of U.S. Appl. No. 11/150,820", Nov. 16, 2011, pp. 1-10, Published in: CN.
European Patent Office, "Communication under Rule 71(3) EPC", "from Foreign Counterpart of U.S. Appl. No. 11/150,820", Sep. 13, 2012, pp. 1-40.
European Patent Office, "Office Action", "from Foreign Counterpart of U.S. Appl. No. 11/150,820", Apr. 14, 2008, pp. 1-7, Published in: EP.
European Patent Office, "Office Action", "from Foreign Counterpart of U.S. Appl. No. 11/150,820", Oct. 5, 2009, pp. 1-3, Published in: EP.
European Patent Office, "Office Action", "from Foreign Counterpart of U.S. Appl. No. 11/150,820", Nov. 12, 2010, pp. 1-5, Published in: EP.
European Patent Office, "Office Action", "from Foreign Counterpart of U.S. Appl. No. 11/150,820", Nov. 3, 2011, pp. 1-3, Published in: EP.
Japan Patent Office, "Notification of Reasons for Rejection", "from Foreign Counterpart of U.S. Appl. No. 11/150,820", Nov. 1, 2011, pp. 1-10, Published in: JP.
Japan Patent Office, "Decision of Final Rejection", "from Foreign Counterpart of U.S. Appl. No. 11/150,820", Feb. 28, 2012, pp. 1-8, Published in: JP.
Korean Patent Office, "Office Action", "from Foreign Counterpart of U.S. Appl. No. 11/150,820", Sep. 17, 2012, pp. 1-5, Published in: KR.

* cited by examiner

US 8,743,756 B2

DISTINCT TRANSPORT PATH FOR MIMO TRANSMISSIONS IN DISTRIBUTED ANTENNA SYSTEMS

CROSS-REFERENCE TO RELATED APPLICATIONS

The present application is continuation application of U.S. patent application Ser. No. 13/004,998 (hereafter "the '998 Application") entitled "DISTINCT TRANSPORT PATH FOR MIMO TRANSMISSIONS IN DISTRIBUTED ANTENNA SYSTEMS", filed on Jan. 12, 2011 (currently pending). The present application is also related to commonly assigned and co-pending U.S. patent application Ser. No. 11/150,820 (hereafter "the '820 Application") entitled "PROVIDING WIRELESS COVERAGE INTO SUBSTANTIALLY CLOSED ENVIRONMENTS", filed on Jun. 10, 2005 (currently pending). The present application is also related to commonly assigned and co-pending U.S. patent application Ser. No. 12/775,897 (hereafter "the '897 Application") entitled "PROVIDING WIRELESS COVERAGE INTO SUBSTANTIALLY CLOSED ENVIRONMENTS", filed on May 7, 2010 (currently pending). The present application is also related to commonly assigned and co-pending U.S. patent application Ser. No. 12/845,060 (hereafter "the '060 Application") entitled "DISTRIBUTED DIGITAL REFERENCE CLOCK", filed Jul. 28, 2010 (currently pending). The present application is also related to commonly assigned and co-pending U.S. patent application Ser. No. 12/913,179 (hereafter "the '179 Application") entitled "DISTRIBUTED ANTENNA SYSTEM WITH COMBINATION OF BOTH ALL DIGIAL TRANSPORT AND HYBRID DIGITAL/ANALOG TRANSPORT", filed Oct. 27, 2010 (currently pending). The '998 Application, '820 Application, the '897 Application, the '060 Application, and the '179 Application are all incorporated herein by reference in their entirety.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antennas have been implemented in the art.

SUMMARY

A hybrid expansion unit includes at least one digital communication interface adapted to communicate first and second sets of N-bit words of digitized spectrum with an upstream device. The hybrid expansion unit further includes at least one analog communication interface adapted to communicate first and second sets of bands of analog spectrum with a downstream device. The hybrid expansion unit is adapted to convert between the first set of N-bit words of digitized spectrum and the first set of bands of analog spectrum. The hybrid expansion unit is further adapted to convert between the second set of N-bit words of digitized spectrum and the second set of bands of analog spectrum. The first set of bands of analog spectrum occupy a first frequency range and the second set of bands of analog spectrum occupy a second frequency range. The first frequency range and the second frequency range do not overlap.

DRAWINGS

In accordance with common practice, the various described features are not drawn to scale but are drawn to emphasize specific features relevant to the exemplary embodiments.

DETAILED DESCRIPTION

Figure 1:
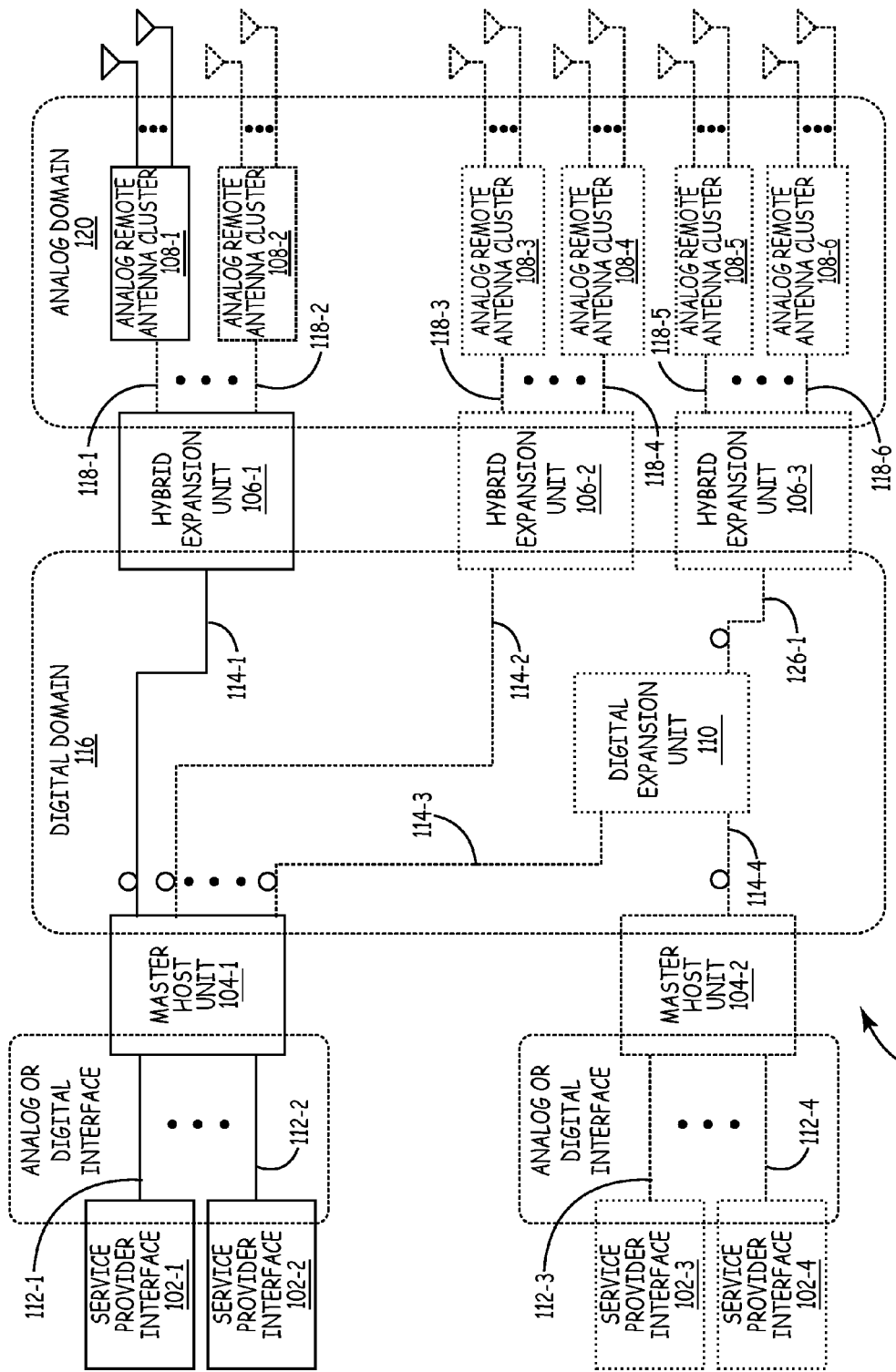
FIG. 1 is a block diagram of one embodiment of a system for providing wireless coverage into a substantially enclosed environment.

FIG. 1 is a block diagram of one embodiment of a system 100 for providing wireless coverage into a substantially enclosed environment. The system 100 includes at least one master host unit (MHU) 104, at least one hybrid expansion unit (HEU) 106, and at least one analog remote antenna cluster (ARAC) 108. The system communicates with a first service provider interface 102-1 and a second service provider interface 102-2, though greater quantities of service provider interfaces 102 are used in other embodiments. Example system 100 includes at least one hybrid expansion unit 106-1 and at least one analog remote antenna cluster 108-1. The hybrid expansion unit 106-1 is connected to the master host unit 104-1 using at least one digital communication link 114-1. The analog remote antenna cluster 108-1 is connected to the hybrid expansion unit 106-1 using at least one analog communication link 118.

Some embodiments of example system 100 include various combinations of additional optional components, such as a digital expansion unit 110 and greater quantities of master host units 104 (such as optional master host unit 104), hybrid expansion units 106 (such as optional hybrid expansion units 106-2 and 106-3), and/or analog remote antenna clusters 108 (such as optional analog remote antenna clusters 108-2 through 108-6). The optional hybrid expansion units 106 are connected to master host units 104 using digital communication links 114 and the optional analog remote antenna clusters are connected to hybrid expansion units 106 using analog communication links. Each optional master host unit 104 operates according to the description below. In addition, each digital expansion unit 110 operates according to the description below. Similarly, each optional hybrid expansion unit 106 operates according to the description below. In addition, each analog remote antenna cluster operates according to the description below.

In some embodiments of system 100, optional analog remote antenna cluster 108-2 is connected to the hybrid expansion unit 106-1 using at least one analog communication link 118-2. Further, some embodiments of system 100 include optional hybrid expansion unit 106-2 connected to the master host unit 104-1 using at least one digital communication link 114-2. In some embodiments, optional analog remote antenna cluster 108-3 is connected to hybrid expansion unit 106-2 through at least one analog communication link 118-3 and optional analog remote antenna cluster 108-4 is connected to hybrid expansion unit 106-2 through at least one analog communication link 118-4.

In some embodiments of system 100, optional digital expansion unit 110 is connected to master host unit 104-1 using at least one digital communication link 114-3. Further, some embodiments of system 100 include optional hybrid expansion unit 106-3 connected to the optional digital expansion unit 110 using at least one digital expansion communication link 126-1. In some embodiments, optional analog remote antenna cluster 108-5 is connected to hybrid expansion unit 106-2 through at least one analog communication link 118-5 and optional analog remote antenna cluster 108-6 is connected to hybrid expansion unit 106-3 through at least one analog communication link 118-6.

Each service provider interfaces 102, such as service provider interface 102-1 and service provider interface 102-2, may include an interface to one or more of a base transceiver station (BTS), a repeater, a bi-directional amplifier, a base station hotel or other appropriate interface for one or more service provider networks. In one embodiment, system 100 distributes a multiple-input multiple-output (MIMO) signal having a first MIMO path and a second MIMO path. As described below, the first and second MIMO paths provide two distinct MIMO paths from the master host unit 104 to the antennas. The combination of the first MIMO path and the second MIMO path facilitate transmission of a MIMO signal. Service provider interface 102-1 is an interface for the first MIMO path and service provider interface 102-2 is an interface for the second MIMO path.

The services may operate using various wireless protocols and in various bands of frequency spectrum. For example, the services may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system 100 is capable of transporting both Single Input Single Output (SISO) and Multiple Input Multiple Output (MIMO) services at any of the frequencies described above. The system 100 can support any combination of SISO and MIMO signals across various bands of frequency spectrum. In some example embodiments, the system 100 may provide MIMO streams for WiMAX, LTE, and HSPA services while only providing SISO streams for other services. Other combinations of MIMO and SISO services are used in other embodiments.

In system 100, service provider interface 102-1 is connected to master host unit 104-1 over an analog communication link 112-1 and service provider interface 102-2 is connected to master host unit 104-1 over an analog communication link 112-2. Each of analog communication link 112-1 and analog communication link 112-2 includes two analog communication media, such as coaxial cables or fiber optic cables. One analog communication media is for downstream communication and the other is for upstream communication. The downstream and upstream analog communication media have been shown as a single analog communication link 112-1 and a single analog communication link 112-2 for simplicity. In other embodiments, analog communication link 112-1 only includes a single physical media, which is used to carry both the downlink and uplink streams between the service provider interface 102-1 and the master host unit 104-1. Similarly, analog communication link 112-2 only includes a single physical media, which is used to carry both the downlink and uplink streams between the service provider interface 102-2 and the master host unit 104-1.

The master host unit 104-1 receives first downstream bands of radio frequency (RF) spectrum representing the first MIMO path from service provider interface 102-1 over the analog communication link 112-1. In addition, the master host unit 104-1 receives second downstream bands of RF spectrum representing the second MIMO path from service provider interface 102-2 over the analog communication link 112-2. In addition, the master host unit 104-1 sends first upstream bands of radio frequency (RF) spectrum to the service provider interface 102-1 over the analog communication link 112-1. In addition, the master host unit 104-1 sends second upstream bands of radio frequency (RF) spectrum to the service provider interface 102-2 over the analog communication link 112-2.

In other embodiments, the service provider interface 102-1 and the service provider interface 102-2 are connected to the master host unit 104-1 using respective digital communication links each using at least one digital communication media. Thus, while this disclosure describes analog communication link 112-1 and analog communication link 112-2, the format of these interfaces is not essential to operation of system 100. If an analog interface is used, the master host unit 104-1 converts the analog signal to a digital format as described below. If a digital interface is used, the master host unit 104-1 will either communicate the digital data as is or reformat the data into a representation that can be used for transport within the digital domain 116 described below. In example embodiments using a single physical medium for each analog communication link 112, frequency division multiplexing (FDM), time division multiplexing (TDM), and optical wavelength division multiplexing (WDM) are used to achieve a duplex connection over the single medium.

System 100 uses both digital and analog transport to extend the coverage of the wireless services into the substantially enclosed environment. First, system 100 uses digital transport over at least one digital communication link 114 to transport digitized RF spectrum between the master host unit 104-1 and the at least one hybrid expansion unit 106. This digital RF spectrum includes both the first MIMO path and the second MIMO path. In some embodiments including digital expansion unit 110, the system 100 uses digital transport over a digital communication link 114-3 to transport digitized RF spectrum including the first and second MIMO paths between the master host unit 104-1 and the digital expansion unit 110. Each digital communication link 114 includes two digital communication media, such as fiber optic cables. One digital communication medium is for downstream communication and the other is for upstream communication. The downstream and upstream digital communication media have been shown as a single digital communication link 114 for simplicity.

The areas of digital transport are called the digital domain 116. In other implementations, digital transport can be used to transport between other components as well and the digital domain 116 is more expansive. In other embodiments, each digital communication link 114 only includes a single physical media, which is used to carry both the downlink and uplink streams between the master host unit 104-1 and the at least one digital expansion unit 110. In example embodiments using a single physical media for each digital communication link 114, optical multiplexing techniques (i.e., wavelength division multiplexing (WDM), coarse wavelength division multiplexing (CWDM), or dense wavelength division multiplexing (DWDM)) are used to achieve a duplex connection over the single medium.

While an optical fiber is used in the example system 100, other appropriate communication media can also be used for the digital transport. For example, other embodiments use free space optics, high speed copper or other wired, wireless, or optical communication media for digital transport instead of the optical fibers used in each of the at least one digital communication link 114. By using digital transport over the at least one digital communication link 114, the bands of RF spectrum provided by the service provider interface 102 can be transported over long distances with minimal errors and more resiliency and robustness to signal loss and distortion of the physical medium. Thus, system 100 may extend coverage for wireless services to buildings located significant distances from the service provider interface 102.

Second, system 100 uses analog transport over at least one analog communication link 118 between the at least one hybrid expansion unit 106 and the at least one analog remote antenna cluster 108 to extend the reach of the digital transport into the substantially enclosed environment. Each analog communication link 118 includes two analog communication media, such as coaxial cables. One analog communication media is for downstream communication and the other is for upstream communication. The downstream and upstream analog communication media have been shown as a single analog communication link 118 for simplicity. While coaxial cable is used in the example system 100, other appropriate communication media can also be used for the analog transport. The areas of analog transport are called the analog domain 120. The first and second MIMO paths are transported in the analog domain using intermediate frequencies (IF).

In other implementations, analog transport can be used to transport between other components as well and the analog domain 120 is more expansive. In other embodiments, each analog communication link 118 only includes a single physical medium, which is used to carry both the downlink and uplink streams between each hybrid expansion unit 106 and each analog remote antenna cluster 108. In example embodiments using a single physical medium for each analog communication link 118, frequency division multiplexing (FDM), time division multiplexing (TDM), and optical wavelength division multiplexing (WDM) are used to achieve a duplex connection over the single medium.

As discussed in further detail below, the various components of system 100 convert the first MIMO path and the second MIMO path between radio frequencies (RF), various intermediate frequencies (IF), digitized bands of RF spectrum, and digitized IF. As baseband representations of the signals can also be used, the invention can be generalized to convert between analog and digital signals. These various conversions require that the digital domain 116 and the analog domain 120 be synchronized in time and frequency. Time synchronization is important to the sampling and reconstruction of the signals. Time synchronization is also important when time alignment of signals in the various parallel branches of the system is necessary. Frequency synchronization is important to maintaining the absolute frequency of the signals at the external interfaces of the system. In order to synchronize the digital domain 116 and the analog domain 120, a common reference clock is distributed throughout both the digital domain 116 and the analog domain 120 as described in detail below. This common clock allows for accurate conversion and recovery between RF, IF, digitized bands of RF spectrum, and digitized IF, or more broadly between analog spectrum and digital spectrum.

Figure 2:
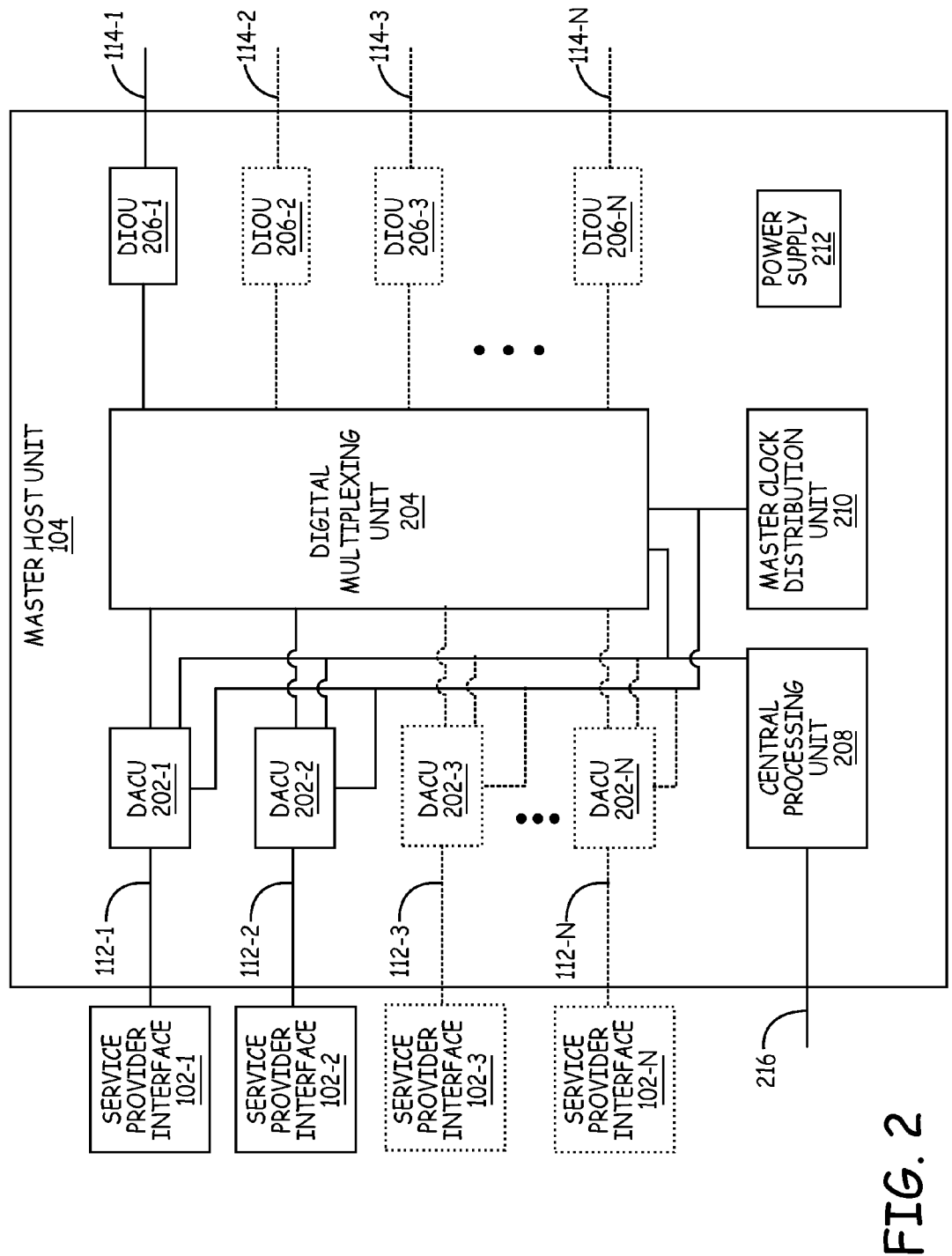
FIG. 2 is a block diagram of one embodiment of a master host unit for the system of FIG. 1.

FIG. 2 is a block diagram of one embodiment of the master host unit 104 of system 100. Master host unit 104 includes at least one digital-analog conversion unit (DACU) 202, at least one digital multiplexing unit (DMU) 204, at least one digital input-output unit (DIOU) 206, at least one central processing unit (CPU) 208, at least one master clock distribution unit (MCDU) 210, and at least one power supply 212.

The master host unit 104 communicates the first MIMO path as a first band of analog spectrum with service provider interface 102-1 and the second MIMO path as a second band of analog spectrum with service provider interface 102-2. In addition, master host unit 104 includes a DACU 202-1 coupled with service provider interface 102-1 and associated with the first MIMO path. The master host unit 104 also includes a DACU 202-2 coupled with service provider interface 102-2 and associated with the second MIMO path. These couplings may be accomplished in various ways. For example, service provider interface 102-1 is directly coupled to DACU 202-1 through analog communication link 112-1. In addition, service provider interface 102-2 is directly coupled to DACU 202-2 through analog communication link 112-2. In some embodiments, single service provider interfaces are coupled to multiple DACU through splitters/combiners. Similarly, in some embodiments, multiple service provider interfaces are coupled to single DACUs through splitter/combiners.

As noted above, each analog communication link 112 of system 100 represents two analog media, one for downstream communication and one for upstream communication. In other embodiments, each link includes greater or fewer analog media. In other embodiments, the master host unit communicates at least one band of digital spectrum with at least one service provider interface across at least one digital communication link using digital data or digitized spectrum. In example embodiments where a digital communication link is used between the service provider interface and the master host unit, the service provider interface communicates digital data directly with the master host unit and no analog to digital conversion, as described below, is necessary at the master host unit.

In these embodiments, the signals from the service provider interfaces 102-1 and 102-2 are first converted from analog to digital before being transmitted across the at least one digital communication link to the master host unit 104. Some example embodiments of master host unit 104 also include additional DACUs, such as DACU 202-3 and DACU 202-N, associated with additional service provider interfaces, such as service provider interface 102-3 and service provider interface 102-N.

Each DACU 202 operates to convert between at least one band of analog spectrum and N-bit words of digitized spectrum. Specifically, DACU 202-1 converts the first MIMO path between a first band of analog spectrum and a first set of N-bit words of digitized spectrum. Similarly, DACU 202-2 converts the second MIMO path between a second band of analog spectrum and a second set of N-bit words of digitized spectrum. In some embodiments, each DACU 202 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/01101482, and incorporated herein by reference. In some implementations, this occurs in stages, such that the analog spectrum is first converted to an IF frequency and subsequently converted to N-bit words of digitized spectrum. The bands of analog spectrum include signals in the frequency spectrum used to transport a wireless service, such as any of the wireless services described above. In some embodiments, master host unit 104 enables the aggregation and transmission of a plurality of services to a plurality of buildings or other structures so as to extend the wireless coverage of multiple services into the structures with a single platform.

The DMU 204 multiplexes N-bit words of digitized spectrum received from a plurality of DACU 202 (DACU 202-1 through DACU 202-N) and outputs a time-multiplexed digital data stream containing both the first MIMO path and the second MIMO path to at least one DIOU 206 (DIOU 206-1 through DIOU 206-N). In other embodiments, the first and second MIMO paths are multiplexed in other ways. The DMU 204 also demultiplexes an upstream time-multiplexed digital data stream containing both the first MIMO path and second MIMO path received from at least one DIOU 206. The DMU 204 outputs a first stream of N-bit words of digitized spectrum containing the upstream first MIMO path to the DACU 202-1. The DMU 204 also outputs a second stream of N-bit words of digitized spectrum containing the upstream second MIMO path to the DACU 202-2. In some embodiments, each DMU 204 is implemented with a Serialized RF (SeRF board) commercially available from ADC Telecommunications, Inc. of Eden Prairie, Minn. as part of the Flex-Wave™ Prism line of products. The SeRF board is also described in U.S. patent application Ser. No. 11/627,251, assigned to ADC Telecommunications, Inc., published in U.S. Patent Application Publication No. 2008/01101482, and incorporated herein by reference.

Each DIOU 206 communicates a time-multiplexed digital data stream containing MIMO paths across at least one digital communication link 114 (digital communication link 114-1 through digital communication link 114-N) using digital transport. The time-multiplexed digital data stream communicated across the digital communication link 114 includes N-bit words of digitized spectrum for both the first MIMO path and second MIMO path. Each DIOU 206 also receives at least one digitized multiplexed signal from the at least one digital communication link 114 using digital transport and sends the at least one digitized multiplexed signal to the DMU 204 for processing. In some embodiments of system 100 shown in FIG. 1, the digital communication link 114-1 is connected to hybrid expansion unit 106-1 and digital communication link 114-3 is connected to optional digital expansion unit 110. DIOU 206-1 communicates using digital transport with hybrid expansion unit 106-1 and DIOU 206-2 communicates using digital transport with digital expansion unit 110. As noted above, each digital communication link 114 represents two digital media, one for downstream communication and one for upstream communication. In addition to carrying the digitized multiplexed signals, each digital communication link 114 may also be used to communicate other types of information such as system management information, control information, configuration information and telemetry information. The hybrid expansion unit 106 and digital remote antenna unit 122 are described in detail below.

Each DACU 202 and DMU 204 is synchronized with the other components of master host unit 104 and system 100 generally. Master clock distribution unit 210 generates a digital master reference clock signal. This signal is generated using any stable oscillator, such as a temperature compensated crystal oscillator (TCXO), an oven controlled crystal oscillator (OCXO), or a voltage controlled crystal oscillator (VCXO). In the embodiment shown in FIG. 2, the stable oscillator is included in the master clock distribution unit 210. In other embodiments, a reference clock external to the master host unit is used, such as a clock from a base station, a GPS unit, or a cesium atomic clock. In embodiments where digital data is communicated between service provider interface 102 and master host unit 104, the master clock distribution unit 210 may derive the reference clock signal from the digital data stream itself or an external clock signal may be used.

The digital master reference clock signal is supplied to each DACU 202 and each DMU 204 in the master host unit 104. Each DACU 202 uses the clock to convert between at least one band of analog spectrum and N-bit words of digitized spectrum. The DMU 204 uses the clock to multiplex the various streams of N-bit words of digitized spectrum together and outputs the multiplexed signal to each DIOU 206. Thus, the downstream digital data streams output by each DIOU 206 are synchronized to the digital master reference clock signal. Thus, through the clocking of the downstream digital data streams, the digital master reference clock signal is distributed to each hybrid expansion unit 106 and each digital expansion unit 110 through each corresponding digital communication link 114.

CPU 208 is used to control each DACU 202 and each DMU 204. An input/output (I/O) line 216 coupled to CPU 208 is used for network monitoring and maintenance. Typically, I/O line 216 is an Ethernet port used for external communication with the system. Other communication protocols such as Universal Serial Bus (USB), IEEE 1394 (FireWire), and serial may also be used. Power supply 212 is used to power various components within master host unit 104.

Figure 3:
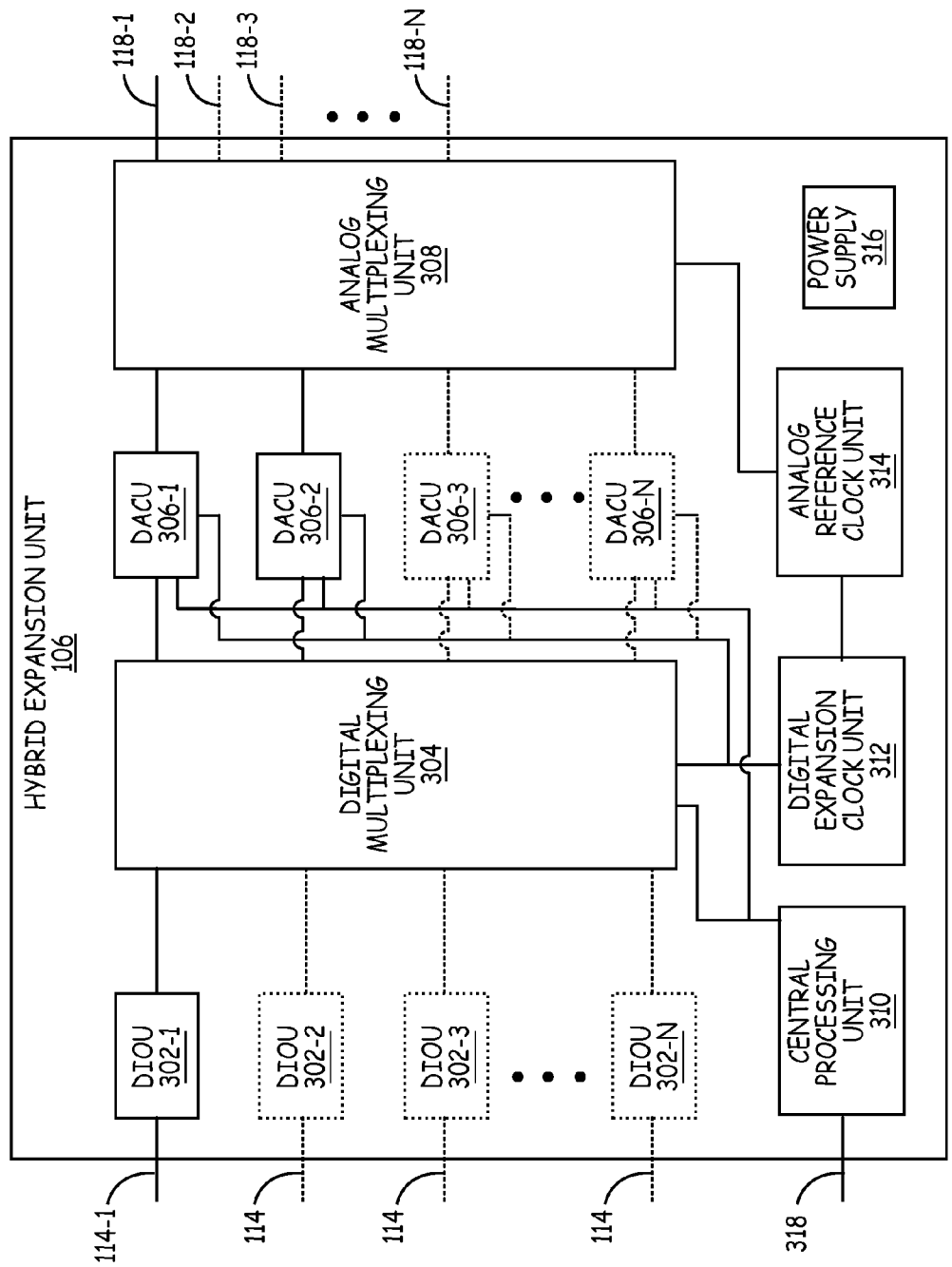
FIG. 3 is a block diagram of one embodiment of a hybrid expansion unit for the system of FIG. 1.

FIG. 3 is a block diagram of one embodiment of a hybrid expansion unit 106 of system 100. Hybrid expansion unit 106 of system 100 includes at least one digital input-output unit (DIOU) 302, at least one digital multiplexing unit (DMU) 304, a first digital-analog conversion unit (DACU) 306-1 and a second digital-analog conversion unit (DACU) 306-2, at least one analog multiplexing unit (AMU) 308, at least one central processing unit (CPU) 310, at least one digital expansion clock unit (DECU) 312, at least one analog domain reference clock unit (ADRCU) 314, and at least one power supply 316.

Each hybrid expansion unit 106 communicates at least one band of digitized spectrum with the master host unit 104 in the form of a multiplexed digitized signal containing N-bit words of digitized spectrum. The multiplexed digitized signal is received at the at least one DIOU 302 through at least one digital communication link 114. In the embodiment shown in FIG. 3, only one DIOU 302-1 is necessary if the hybrid expansion unit 106 is only coupled with a single upstream master host unit 104 (or single upstream digital expansion unit 110 as described in detail below). In other embodiments that require more data throughput than can be handled by a single digital data link 114, a single hybrid expansion unit 106 includes multiple DIOUs 302 (such as optional DIOU 302-2 through DIOU 302-N) that are used to couple a single master host unit 104 with the single hybrid expansion unit 106. In other embodiments, hybrid expansion unit 106 has multiple DIOUs 302 (such as optional DIOU 302-1 through DIOU 302-N) and is connected to multiple upstream master host units 104 or digital expansion units 110 through digital communication links 114. In other embodiments, hybrid expansion unit 106 is connected to other hybrid expansion units through DIOU 302. In some embodiments including multiple upstream connections, the hybrid expansion unit 106 selects one DIOU 302 to extract the clock signal from.

The at least one DIOU 302 communicates the multiplexed digitized signal containing N-bit words of digitized spectrum to the DMU 304. The DMU 304 demultiplexes N-bit words of digitized spectrum representing the first MIMO path and the second MIMO path from the digitized signal received from the at least one DIOU 302 and sends the N-bit words of digitized spectrum representing the first MIMO path to the DACU 306-1 and the N-bit words of digitized spectrum representing the second MIMO path to the DACU 306-2. DACU 306-1 converts the N-bit words of digitized spectrum representing the first MIMO path to a third band of analog spectrum. DACU 306-2 converts the N-bit words of digitized spectrum representing the second MIMO path to a fourth band of analog spectrum.

In some embodiments, DACU 306-1 and DACU 306-2 convert the digitized signals into intermediate frequencies for simultaneous transport across a single analog medium. Specifically, DACU 306-1 converts the first MIMO path from N-bit words of digitized spectrum into a third band of analog spectrum occupying a first frequency range. In addition, DACU 306-2 converts the second MIMO path from N-bit words of digitized spectrum into a third band of analog spectrum occupying a second frequency range. The third band of analog spectrum and the fourth band of analog spectrum are each at a different intermediate frequencies (IFs), allowing both the first MIMO path and the second MIMO path to be simultaneously communicated across an analog medium as described below. In some other embodiments, the at least one DACU 306 converts the digitized signal back to the original analog frequency provided by the at least one service provider interface 102. In other embodiments, other components are included in the hybrid expansion unit 106 that frequency convert at least one band of analog spectrum output by the DACU 306 into an intermediate frequency for transport. In other embodiments including additional MIMO paths or other signals, additional DACU 306 are used, such as DACU 306-3 and DACU 306-N.

Each DACU 306 is coupled with the AMU 308. Each DACU 306 also converts at least one band of analog spectrum received from the AMU 308 into N-bit words of digitized spectrum. AMU 308 receives multiple bands of analog spectrum from multiple DACU 306 and multiplexes the bands of analog spectrum together into at least one multiplexed analog signal including multiple bands of analog spectrum. In some embodiments, there are a plurality of multiplexed analog signals output from the AMU 308. In some embodiments, all of the bands of analog spectrum from each DACU 306 are included on each multiplexed signal output by AMU 308. In other embodiments, a subset of the bands of analog spectrum from a plurality of DACU 306 are multiplexed onto one signal output on one of the at least one analog communication link 118, while a different subset of bands of analog spectrum from a plurality of DACU 306 are multiplexed onto another signal output on another of the at least one analog communication link 118. In other embodiments, different combinations of bands of analog spectrum from various DACU 306 are multiplexed onto various analog communication links 118.

In some embodiments, each DACU 306 converts a band of digitized spectrum to a different analog frequency from the other DACU 306. Each band of analog spectrum is pre-assigned to a particular analog frequency. Then, the AMU 308 multiplexes the various pre-assigned analog frequencies together, in addition to the analog domain reference clock and any communication, control, or command signals and outputs them using at least one analog communication link 118. Specifically, DACU 306-1 converts the first MIMO path between the first N-bit words of digitized spectrum and a first intermediate frequency (IF). Similarly, DACU 306-2 converts the second MIMO path between the second N-bit words of digitized spectrum and a second intermediate frequency (IF). The AMU 308 then multiplexes the first and second MIMO paths together and outputs them using the analog communication link 118-1.

In other embodiments, each DACU 306 converts a band of analog spectrum to the same analog frequency as the other DACU 306. Then, the AMU 308 shifts the received signals into distinct analog frequencies and multiplexes them together and outputs them using at least one analog communication link 118. Specifically, DACU 306-1 converts the first MIMO path between the first N-bit words of digitized spectrum and a first analog spectrum. Similarly, DACU 306-2 converts the second MIMO path between the second N-bit words of digitized spectrum and a second analog spectrum. The AMU 308 then shifts the first analog spectrum to a first intermediate frequency (IF) and shifts the second analog spectrum to a second intermediate frequency (IF). The AMU 308 multiplexes the first and second intermediate frequencies together and outputs them using the analog communication link 118-1.

In the embodiment shown in FIG. 3, the AMU 308 multiplexes the analog frequencies received from each DACU 306 onto each analog communication link 118. In other embodiments, bands of frequency spectrum from certain DACU 306 are selectively distributed to certain analog communication links 118. In one example embodiment, analog communication link 118-1 is coupled to analog remote antenna cluster 108-1 and only a first subset of bands of analog spectrum are transported using analog communication link 118-1. Further, analog communication link 118-2 is coupled to analog remote antenna cluster 108-2 (shown in FIG. 8 and described below) and only a second subset of bands of analog spectrum are transported using analog communication link 118-2. In another embodiment, a first subset of bands of analog spectrum are transported to analog remote antenna cluster 108-1 using analog communication link 118-1 and a second subset of bands of analog spectrum are transported to the same analog remote antenna cluster 108-1 using analog communication link 118-2. It is understood that these examples are not limiting and that other system topologies, hierarchies, and structures are used in other embodiments.

Each DMU 304, DACU 306, and AMU 308 is synchronized with the other components of hybrid expansion unit 106 and system 100 generally. In the example embodiment shown in FIG. 3, DIOU 302-1 receives the data stream from a master host unit 104 via a digital communication link 114 in an optical format. DIOU 302-1 converts the data stream from the optical format to an electrical format and passes the data stream onto the DMU 304. The DMU 304 extracts the digital master reference clock signal from the data stream itself. Because the data stream was synchronized with the digital master reference clock signal at the master host unit 104, it can be recovered from the data stream itself. The extracted digital master reference clock signal is sent to the digital expansion clock unit 312. Each DIOU 302 is not required to be synchronized to the other parts of the hybrid expansion unit unless it performs some type of function that requires it to be synchronized. In one embodiment, the DIOU 302 performs the extraction of the digital master reference clock in which case it would be synchronized to the remainder of the hybrid expansion unit.

The digital expansion clock unit 312 receives the digital master reference clock signal extracted from the data stream received from the master host unit 104. The digital expansion clock unit 312 communicates the digital master reference clock signal to various components of the hybrid expansion unit 106, including the DMU 304 and each DACU 306. Each DMU 304 and DACU 306 uses the digital master reference clock signal to synchronize itself with the system 100. In other embodiments, the digital expansion clock unit 312 could receive a copy of the data stream from the DMU 304 and extract the digital master reference clock signal from the data stream itself. In some embodiments, each DIOU 302 is selectable and configurable, so that one DIOU 302 can be selected to receive the digital master reference clock signal and other DIOUs 302 can be used to send the digital master reference clock signal upstream to other system components, such as secondary master host units, digital expansion units, or other hybrid expansion units.

In addition, the digital expansion clock unit 312 distributes the digital master reference clock signal to the analog domain reference clock unit 314. The analog domain reference clock unit 314 in turn generates an analog domain reference clock signal based on the digital master reference clock signal. This analog domain reference clock signal is used to synchronize analog components in the hybrid expansion unit 106, such as analog frequency conversion functions in the AMU 308. In addition, the AMU multiplexes the analog domain reference clock signal onto the multiplexed signals sent on each analog communication link 118 to the at least one analog remote antenna cluster 108.

In the embodiment of hybrid expansion unit 106 shown in FIG. 3, the analog domain reference clock unit 314 generates the analog domain reference clock signal by running the digital master reference clock signal through a phase locked loop circuit. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is multiplexed onto the multiplexed signals sent on each analog communication link 118 to at least one analog remote antenna cluster 108.

CPU 310 is used to control each DMU 304 and each DACU 306. An input/output (I/O) line 318 coupled to CPU 310 is used for network monitoring and maintenance. Typically, I/O line 318 is an Ethernet port used for external communication with the system. Power supply 316 is used to power various components within hybrid expansion unit 106.

In addition to performing the analog frequency conversion functions described above, the AMU 308 couples power onto the analog communication link 118. This power is then supplied through the analog communication link 118 to the downstream analog remote antenna cluster 108, including master analog remote antenna unit 402 and slave analog remote antenna units 404-1 as described below. The power coupled onto the analog communication link 118 is supplied from the power supply 316. In the example embodiment shown, 54 volts DC is received by AMU 308 from the power supply 316 and is coupled to the analog communication link 118 by AMU 308.

The hybrid expansion unit 106 shown in FIG. 3 sends and receives digital signals from the upstream and sends and receives analog signals in the downstream. In other example hybrid expansion units, both analog and digital signals can be sent in the downstream across various media. In one example embodiment a digital downstream output line (not shown) is connected to the downstream side of the DMU 304 and goes through a DIOU before being output in the downstream. This digital downstream line does not go through a DACU 306 or the AMU 308. In other example embodiments of the hybrid expansion unit 106, various other combinations of upstream and downstream digital and analog signals can be aggregated, processed, routed.

Figure 4:
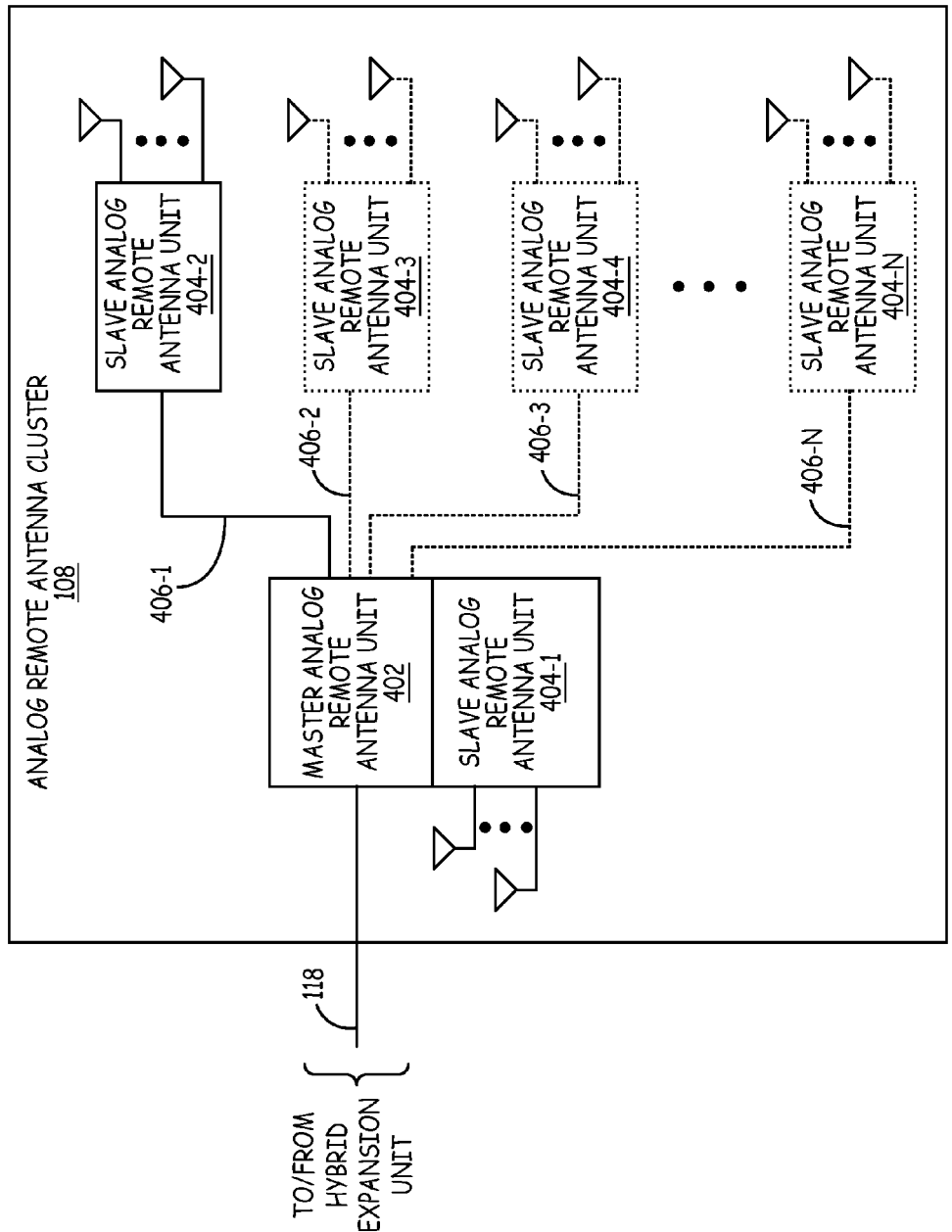
FIG. 4 is a block diagram of one embodiment of an analog remote antenna cluster for the system of FIG. 1.
Figure 5:
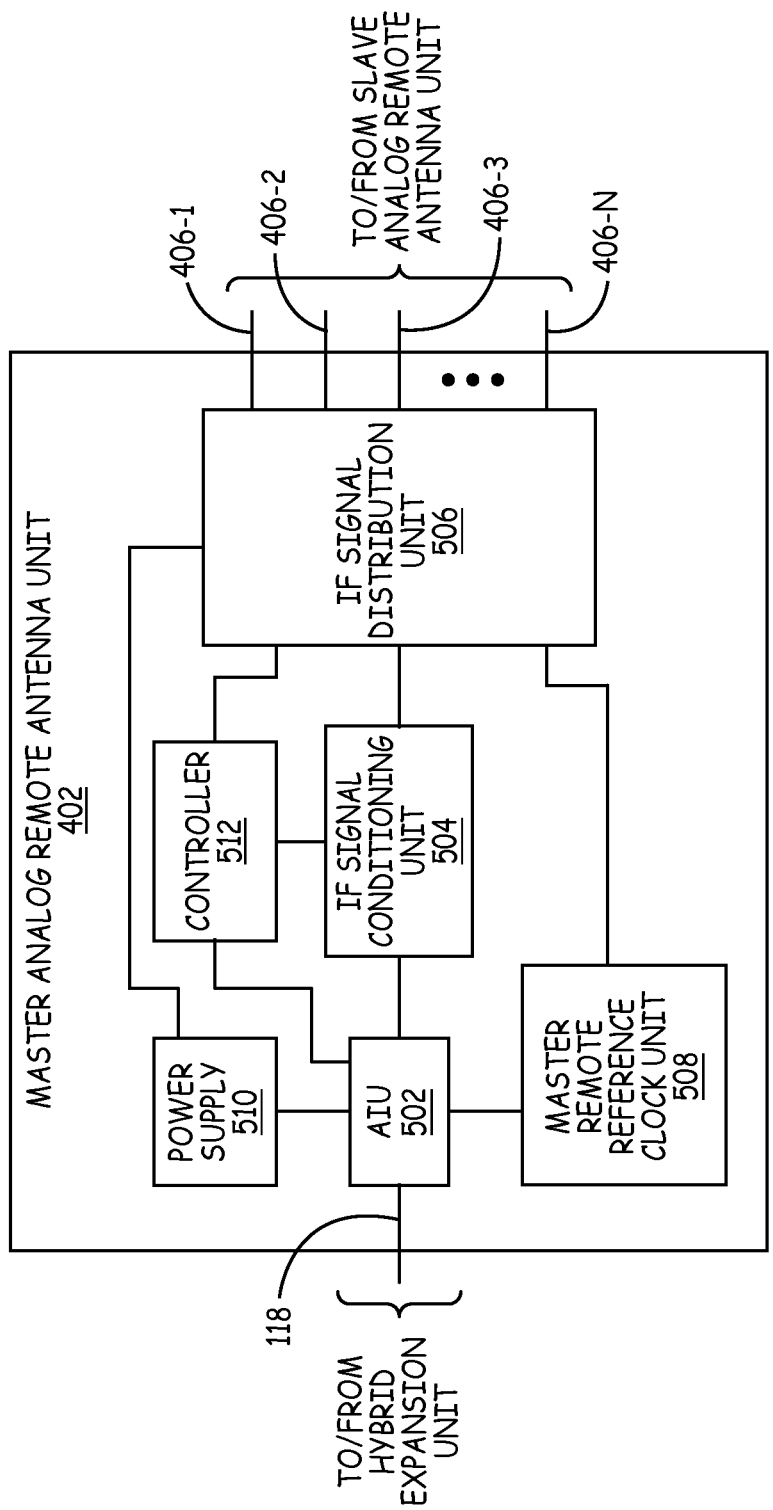
FIG. 5 is a block diagram of one embodiment of a master analog remote antenna unit for the analog remote antenna unit cluster of FIG. 4.
Figure 6:
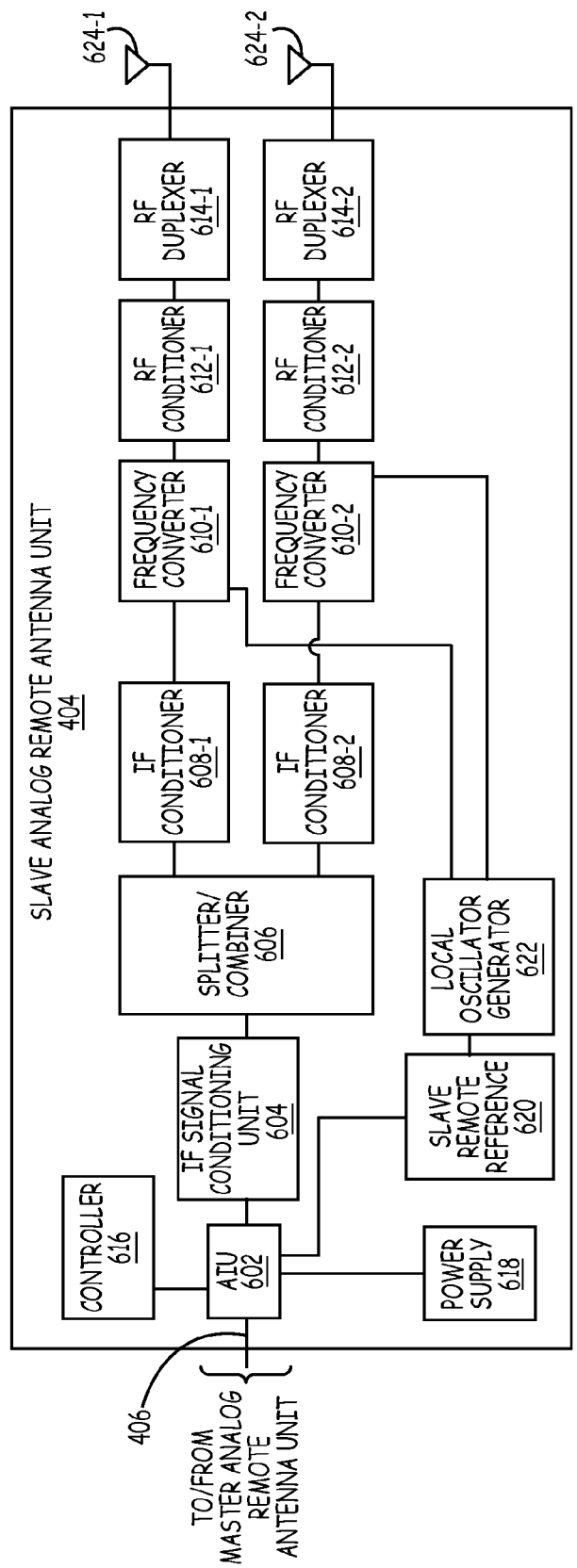
FIG. 6 is a block diagram of one embodiment of a slave analog remote antenna unit for the analog remote antenna unit cluster of FIG. 4.

In the embodiments described and depicted in FIGS. 4-6, the term analog intermediate frequency (IF) spectrum is used to describe the analog signals transported in the analog domain 120 between the hybrid expansion units 106 and the analog remote antenna clusters 108. The term analog IF spectrum is used to distinguish the signals from the analog RF spectrum format that is communicated to the service provider interface and the mobile devices over the air interfaces discussed below. Example system 100 uses analog IF spectrum for transport within the analog domain 120 that is lower in frequency than the analog RF spectrum. In other example embodiments, the RF spectrum can be transmitted at its native frequency within the analog domain 120 or using an analog IF spectrum that is higher in frequency than the analog RF spectrum.

FIG. 4 is a block diagram of one embodiment of an analog remote antenna cluster 108 for system 100. Analog remote antenna cluster 108 includes a master analog remote antenna unit 402 and a plurality of slave analog remote antenna units 404-1 through 404-N. In other embodiments, other configurations are used instead of this master/slave configuration, such as just a single analog remote antenna unit connected directly to the hybrid expansion unit.

In example analog remote antenna cluster 108, the master analog remote antenna unit 402 is coupled to at least one analog communication link 118. In the embodiment shown in FIG. 4, the at least one coaxial cable includes two coaxial cables. A first coaxial cable is used to transport downstream communication from a hybrid expansion unit 106 and the analog remote antenna cluster 108, including the bands of downstream analog spectrum associated with the service providers. A second coaxial cable is used to transport upstream communication from the analog remote antenna cluster 108 to the hybrid expansion unit 106, including the bands of upstream analog spectrum associated with the service providers. The downstream analog spectrum and the upstream analog spectrum are transported on separate coaxial cables in this example embodiment due to bandwidth limitations of the coaxial cable being used as media. In other example embodiments, a single analog communication link 118 is used to transport both the downstream and upstream analog spectrum. In other example embodiments, the at least one analog communication link 118 includes greater than two coaxial cables in order to transport even more bands. In other example embodiments, different media such as twisted pair (i.e., unshielded twisted pair (UTP) or screened unshielded twisted pair (ScTP)), CATV cable, or optical fibers are used to transport the analog signals instead of coaxial cables.

In example analog remote antenna cluster 108, the master analog remote antenna unit 402 coordinates the distribution of various bands of analog RF spectrum to various slave analog remote antenna units 404 through analog communication links 406. The master analog remote antenna unit 402 is discussed in further detail below. In the example analog remote antenna cluster 108, each slave analog remote antenna unit 404-1 through 404-N receive at least one band of analog RF spectrum from the master analog remote antenna unit 402. Each slave analog remote antenna unit 404-1 through 404-N then transmits and receives the at least one band of analog RF spectrum wirelessly across an air medium using at least one antenna. The slave analog remote antenna unit 404 is discussed in further detail below. In one example embodiment, the first MIMO path and the second MIMO path are both communicated from the master host unit to at least one of the slave analog remote antenna units 404, such as slave analog remote antenna unit 404-1, which in turn communicates the first and second MIMO paths across air interfaces as discussed below.

FIG. 5 is a block diagram of one embodiment of a master analog remote antenna unit 402 from the analog remote antenna cluster 108. Master analog remote antenna unit 402 includes an analog interface unit (AIU) 502, an IF signal conditioning unit 504, an IF signal distribution unit 506, a master remote reference clock 508, a power supply 510, and a controller 512. Other example embodiments of master analog remote antenna unit include greater or fewer components.

The at least one analog communication link 118 is connected to the master analog remote antenna unit 402 through the AIU 502. One of the primary functions of the AIU is to handle any type of media conversion that may be necessary which in some embodiments may involve impedance transformation. Specifically, in the example embodiment shown in FIG. 5, the AIU 502 performs impedance conversion from the 75 ohms of the coaxial cables carrying the downstream and upstream bands of analog spectrum to the 50 ohms used within the master analog remote antenna unit 402. The AIU 502 also includes a coupler that is used to extract the DC power received from the hybrid expansion unit 106 across the at least one analog communication link 118.

In addition, the analog reference clock signal is extracted from the signal received from the hybrid expansion unit 106 across the at least one analog communication link 118. This analog reference clock signal is sent to the master remote reference clock unit 508. Any control signals received from the hybrid expansion unit 106 across the at least one analog communication link 118 are also extracted and sent to the controller 512.

Power supply 510 receives DC power from the AIU 502 and then generates the necessary DC power for operation of the various components onboard the master analog remote antenna unit 402. Thus, master analog remote antenna unit 402 does not need a separate power source other than the power that is received across the at least one analog communication link 118. In the example embodiment shown, a DC voltage is extracted from the signal received across the at least one analog communication link 118 by the AIU 502. A minimum of 28 volts DC is then used by the power supply 510 to generate 5 volts DC and 12 volts DC to power the various devices in the master analog remote antenna unit. In addition, the power received across the analog communication link 118 is sent by the power supply 510 to the IF signal distribution unit 506 where it is coupled onto the analog communication links 406 that connect to each slave analog remote antenna unit 404 so that each slave analog remote antenna units 404 can also derive power from the cable instead of having a separate external power source. Thus, power for both the master analog remote antenna unit 402 and each slave analog remote antenna unit 404 is provided by the hybrid expansion unit 106 through the analog communication links 118 and 406.

As noted above, the AIU 502 extracts the clock signal and supplies it to the master remote reference clock unit 508. The master remote reference clock unit 508 refines the original clock signal received from the hybrid expansion unit 106 across the at least one analog communication link 118. In example embodiments, the master remote reference clock unit 508 processes the clock signal through a phase locked loop to refine the signal. In this way, noise, distortion, and other undesirable elements are removed from the reference clock signal. In other embodiments, the clock signal is processed through a filter to remove adjacent spurious signals. The refined signal output from the master remote reference clock unit 508 is sent to the IF signal distribution unit 506, where it is coupled onto the outputs of the IF signal distribution unit 506 that are connected to the slave analog remote antenna units 404. In this way, the master reference clock signal is redistributed by the master analog remote antenna unit 402 to all the slave analog remote antenna units 404.

IF signal conditioning unit 504 is configured to remove distortion in the analog IF signals that traverse the analog communication link 118. In the example master analog remote antenna unit 402 shown in FIG. 5, IF signal conditioning unit 504 performs cable equalization for signals sent and received across the at least one analog communication link 118. The at least one analog communication link 118 is generally quite long, causing the gain to vary as a function of frequency. IF signal conditioning unit 504 adjusts for gain at various frequencies to equalize the gain profile. IF signal conditioning unit 504 also performs filtering of the analog IF signals to remove adjacent interferers or spurious signals before the signals are propagated further through the system 100.

Controller 512 receives control signals from the AIU 502 that are received from hybrid expansion unit 106 across the at least one analog communication link 118. Controller 512 performs control management, monitoring, and can configure parameters for the various components of the master analog remote antenna unit 402. In the example master analog remote antenna unit 402, the controller 512 also drives the cable equalization algorithm.

IF signal distribution unit 506 is used to distribute the signals processed by the IF signal conditioning unit 504 to various slave analog remote antenna units 404 across analog communication links 406-1 through 406-N. In the example embodiment shown in FIG. 5, two bands are sent across each analog communication link 406 at two different analog IF frequencies. As noted above, the IF signal distribution unit 506 is also used to couple the DC power, the analog reference clock, and any other communication signals from the master analog remote antenna unit 402 onto analog communication link 406. The IF signal conditioning occurs at the IF signal conditioning unit 504 before the various analog signals are distributed at the IF signal distribution unit 506 in the embodiment shown in FIG. 5. In other embodiments, the IF signal conditioning could be done after the distribution of the analog signals.

FIG. 6 is a block diagram of one embodiment of a slave analog remote antenna unit 404 for the analog remote antenna unit cluster 108. The slave analog remote antenna unit 404 includes an analog interface unit (AIU) 602, an IF signal conditioning unit 604, a splitter/combiner 606, a plurality of IF conditioners 608, a plurality of frequency converters 610, a plurality of RF conditioners 612, and a plurality of RF duplexers 614. While the slave analog remote antenna unit 404 is described as a separate component, in some example embodiments, a slave analog remote antenna unit 404 is integrated with a master analog remote antenna unit 402.

The AIU 602 is connected to the analog communication link 406. The AIU 602 includes a coupler that is used to extract the DC power received from the master analog remote antenna unit 402 across the analog communication link 406. The AIU 602 passes the extracted DC power to the power supply 618. The power supply 618 in turn powers the various components of the slave analog remote antenna unit 404. The AIU 602 also extracts control signals received from the master analog remote antenna unit 402 across the analog communication link 406. The control signals are sent by the AIU 602 to the controller 616. The controller 616 uses the control signals to control various components of the slave analog remote antenna unit 404. In particular, the control signals are used by the controller 616 to control the gain in the IF signal conditioning unit 604. Adjustments may be made based on temperature changes and other dynamic factors. The control signals are also used for the configuration of the subsequent frequency converters 610, IF conditioners 608, and RF conditioners 612.

The AIU 602 also extracts the analog reference clock and sends it to the slave remote reference clock unit 620. In the embodiment shown in FIG. 6, the slave remote reference clock unit 620 refines the reference clock signal using a band pass filter. In other embodiments, the reference clock signal drives a phase locked loop to generate a refined reference clock signal. The slave remote reference clock unit 620 distributes the refined reference clock signal to the local oscillator generator 622, which generates local oscillator signals for the mixers used for frequency conversion. The local oscillator signals are generated using a phase locked loop. In the example shown in FIG. 6, the local oscillator generator 622 generates four local oscillator frequencies for each of the carrier signals of a first and second band. A first local oscillator frequency is used for downlink data in a first band and a second local oscillator frequency is used for the uplink data in the first band. A third local oscillator frequency is used for the downlink data in a second band and a fourth local oscillator frequency is used for the uplink data in the second band. In other example embodiments, greater or fewer bands are used and greater or fewer local oscillator signals are created by the local oscillator generator 622. For example, some embodiments may require diversity, so that two uplinks are needed for each downlink and three local oscillators would need to be generated for each band. In example embodiments, the AIU 602 is also used to impedance convert between the signal received on the analog communication link 406 and the signal processed by various components of the slave analog remote antenna unit 404.

Various analog spectrum including the first and second MIMO paths is received across the analog communication link 406 by the AIU 602 is passed to the IF signal conditioning unit 604. The IF signal conditioning unit 604 filters out noise, distortion, and other undesirable elements of the signal using amplification and filtering techniques. The IF signal conditioning unit 604 passes the analog spectrum to the splitter/combiner 606, where the various bands including the first and second MIMO paths are split out of the signal in the downlink and combined together in the uplink. In the downstream, a first band including the first MIMO path is split out and passed to the IF conditioner 608-1 and a second band including the second MIMO path is split out and passed to the IF conditioner 608-2. In the upstream, the first band including the first MIMO path is received from the IF conditioner 608-1, the second band including the second MIMO path is received from the IF conditioner 608-2, and the two upstream bands are combined by the splitter/combiner 606.

In the downstream for the first band having the first MIMO path, IF conditioner 608-1 passes the IF signal having the first MIMO path to the frequency converter 610-1. The frequency converter 610-1 receives a downstream mixing frequency for the first band having the first MIMO path from local oscillator generator 622. The frequency converter 610-1 uses the downstream mixing frequency for the first band having the first MIMO path to convert the downstream IF signal for the first band having the first MIMO path to a downstream RF signal. The downstream RF signal for the first band having the first MIMO path is passed onto the RF conditioner 612-1, which performs RF gain adjustment and filtering on the downstream RF signal for the first band having the first MIMO path. The RF conditioner 612-1 passes the downstream RF signal for the first band having the first MIMO path to the RF duplexer 614-1, where the downstream RF signal for the first band having the first MIMO path is combined onto the same medium with an upstream RF signal for the first band having the first MIMO path. The first band having the first MIMO path is transmitted and received across an air medium using a first antenna 624-1 while the second band having the second MIMO path is transmitted and received across an air medium using a second antenna 624-2. In other embodiments, greater amounts of antennas are used. In some embodiments, the downstream signals are transmitted from one antenna and the upstream signals are received from another antenna. In embodiments with these types of alternative antenna configurations, the requirements and design of the RF duplexers 614 will vary to meet the requirements of the antenna configuration.

In the downstream for the second band having the second MIMO path, IF conditioner 608-2 passes the IF signal for the second band having the second MIMO path to the frequency converter 610-2. The frequency converter 610-2 receives a downstream mixing frequency for the second band having the second MIMO path from local oscillator generator 622. The frequency converter 610-2 uses the downstream mixing frequency for the second band having the second MIMO path to convert the downstream IF signal for the second band having the second MIMO path to a downstream RF signal. The downstream RF signal for the second band having the second MIMO path is passed onto the RF conditioner 612-2, which performs more RF adjustment and filtering on the downstream RF signal for the second band having the second MIMO path. The RF conditioner 612-2 passes the downstream RF signal for the second band having the second MIMO path to the RF duplexer 614-2, where the downstream RF signal for the second band having the second MIMO path is combined onto the same medium with an upstream RF signal for the second band having the second MIMO path. As described above, the first band having the first MIMO path is transmitted and received across an air medium using a first antenna 624-1 while the second band having the second MIMO path is transmitted and received across an air medium using a second antenna 624-2.

In the upstream, the first antenna 624-1 receives the RF signal for the first band having the first MIMO path. The upstream RF signal for the first band having the first MIMO path is then passed from the first antenna 624-1 to the RF duplexer 614-1, where the upstream RF signal and the downstream RF signal for the first band having the first MIMO path are separated onto different signal lines. The upstream RF signal for the first band having the first MIMO path is then passed to the RF conditioner 612-1, which performs gain adjustment and filtering on the upstream RF signal for the first band having the first MIMO path. Finally, the upstream RF signal for the first band having the first MIMO path is passed to frequency converter 610-1, which frequency converts the upstream RF signal for the first band having the first MIMO path into an upstream IF signal for the first band having the first MIMO path using an upstream mixing frequency generated by the local oscillator generator 622.

In the upstream, the second antenna 624-2 receives the RF signal for the second band having the second MIMO signal. The upstream RF signal for the second band having the second MIMO signal is then passed from the second antenna 624-2 to the RF duplexer 614-2, where the upstream RF signal and the downstream RF signal for the second band having the second MIMO signal are separated onto different signal lines. The upstream RF signal for the second band having the second MIMO signal is then passed to the RF conditioner 612-2, which performs gain adjustment and filtering on the upstream RF signal for the second band having the second MIMO signal. Finally, the upstream RF signal for the second band having the second MIMO signal is passed to frequency converter 610-2, which frequency converts the upstream RF signal for the second band having the second MIMO signal into an upstream IF signal for the second band having the second MIMO signal using an upstream mixing frequency generated by the local oscillator generator 622.

In embodiments where the functions of the master analog remote antenna unit 402 and the slave analog remote antenna unit 404-1 are integrated into the same physical package, as depicted in FIG. 4, some of the redundant functions in the master analog remote antenna unit 402 and the slave analog remote antenna unit 404-1 may be removed. For example, the two units may share the same controller and power supply. The slave remote reference clock 620 may not be required as the signal from the master remote reference clock unit 508 could be routed directly to the local oscillator generator 622.

Figure 7:
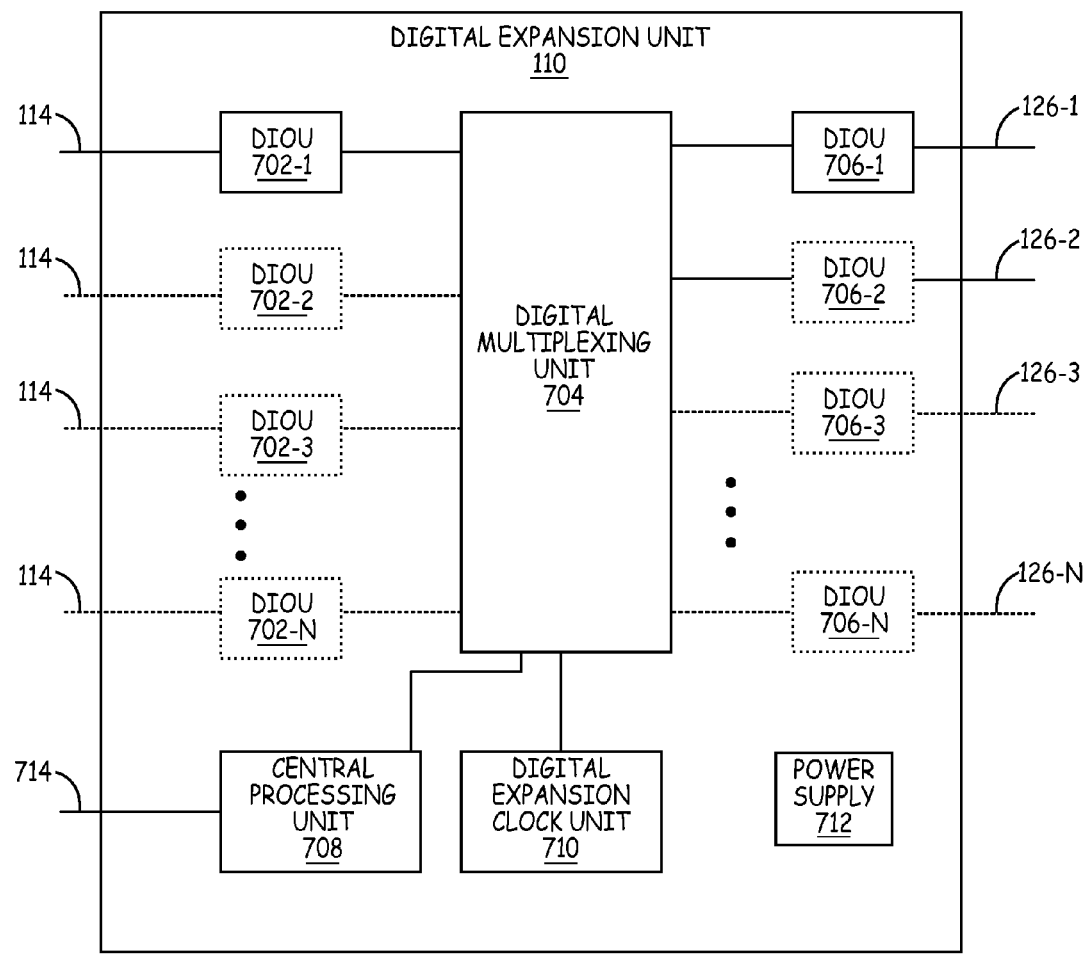
FIG. 7 is a block diagram of one embodiment of a digital expansion unit for the system of FIG. 1.

FIG. 7 is a block diagram of one embodiment of optional digital expansion unit 110 of system 700. Optional digital expansion unit 110 includes at least one digital input-output unit (DIOU) 702, at least one digital multiplexing unit (DMU) 704, at least one digital input-output unit (DIOU) 706, at least one central processing unit (CPU) 708, at least one digital expansion clock unit 710, and at least one power supply 712. It is understood that the DMU 704 performs both multiplexing and demultiplexing functionality between the various upstream and downstream connections.

The optional digital expansion unit 110 communicates N-bit words of digitized spectrum between a master host unit 104 and at least one hybrid expansion unit 106. Each DIOU 702 (DIOU 702-1 through DIOU 702-N) of the digital expansion unit 110 operates to convert between optical signals received across a digital expansion communication link 126 and electrical signals processed within the digital expansion unit 110. In the downstream, the converted signals are passed from each DIOU 702 to the DMU 704, where they are multiplexed together and output to at least one DIOU 706 which converts the electrical signals to optical signals and outputs the optical signals to at least one hybrid expansion unit or another digital expansion unit for further distribution. In the upstream, each DIOU 706 converts optical signals received from a downstream hybrid expansion unit or digital expansion unit into electrical signals, which are passed onto the DMU 704. The DMU 704 takes the upstream signals and multiplexes them together and outputs them to at least one DIOU 702, which converts the electrical signals into optical signals and sends the optical signals across a digital expansion communication link 114 toward the master host unit. In other embodiments, multiple digital expansion units are daisy chained for expansion in the digital domain.

In the example embodiment shown in FIG. 7, the CPU 708 is used to control each DMU 704. An input/output (I/O) line 714 coupled to CPU 708 is used for network monitoring and maintenance. Typically, I/O line 714 is an Ethernet port used for external communication with the system. The DMU 704 extracts the digital master reference clock signal from any one digital data stream received at any one of the DIOU 702 and DIOU 706 and sends the digital master reference clock signal to the digital expansion clock unit 710. The digital expansion clock unit 710 then provides the digital master reference clock signal to other functions in the DMU that require a clock signal. Power supply 712 is used to power various components within digital expansion unit 110.

Some embodiments of system 100 including optional digital expansion unit 110, as in FIG. 1, further include additional service provider interfaces, such as optional service provider interface 102-3 and 102-4, and additional master host units, such as optional master host unit 104-2. In one example embodiment, additional master host unit 104-2 is connected to service provider interface 102-3 through analog communication link 112-3 and connected to service provider interface 102-4 through analog communication link 112-4.

Optional digital expansion unit 110 is then connected to master host unit 104-1 through digital communication link 114-3 and also connected to the master host unit 104-2 through digital communication link 114-4. In addition, optional digital expansion unit 110 includes DIOU 702-1 and DIOU 702-2 as shown in FIG. 7. DIOU 702-1 is coupled with digital communication link 114-2 and DIOU 702-2 is coupled with digital communication link 114-4 and connected to the additional master host unit 104-2. DIOU 702-1 and DIOU 702-2 are coupled to DMU 704, which multiplexes and demultiplexes upstream and downstream signals together allowing various bands to be distributed from master host unit 104-1 and master host unit 104-2 through the analog remote antenna clusters 108 and the digital remote antenna units 122. Other example systems include greater or fewer service provider interfaces 102, master host units 104, hybrid expansion units 106, analog remote antenna clusters 108, digital remote antenna units 122, and digital expansion units 110.

Figure 8:
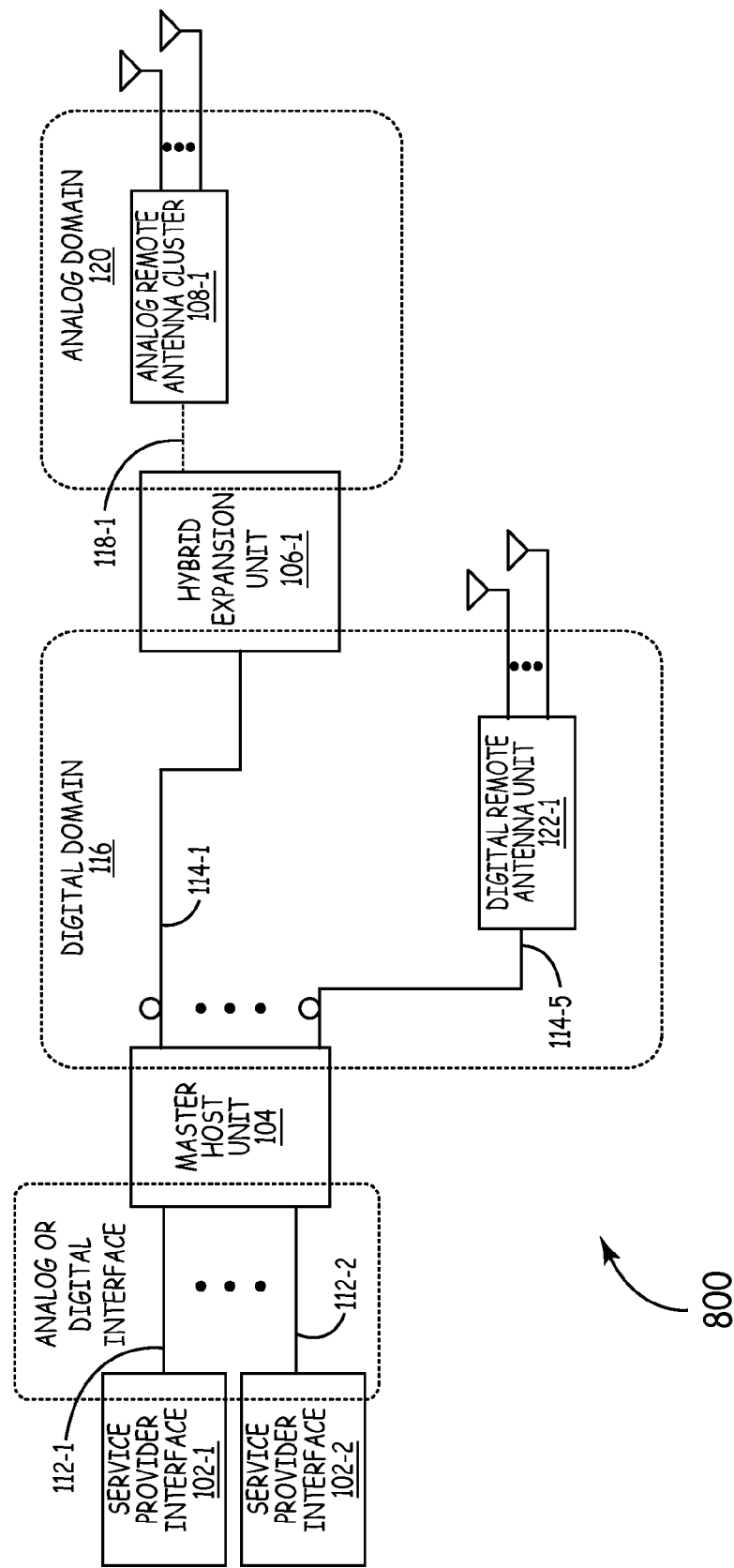
FIG. 8 is a block diagram of another embodiment of a system for providing wireless coverage into a substantially enclosed environment.

FIG. 8 is a block diagram of another embodiment of a system 800 for providing wireless coverage into a substantially enclosed environment. The system 800 includes many of the same components as system 100, including the master host unit 104-1, the hybrid expansion unit 106-1, and the analog remote antenna cluster 108-1. As with system 100, example system 800 is also connected to both service provider interface 102-1 and service provider interface 102-2. Example system 800 differs from example system 100 because it includes digital remote antenna unit 122-1 (described in detail below).

Figure 9:
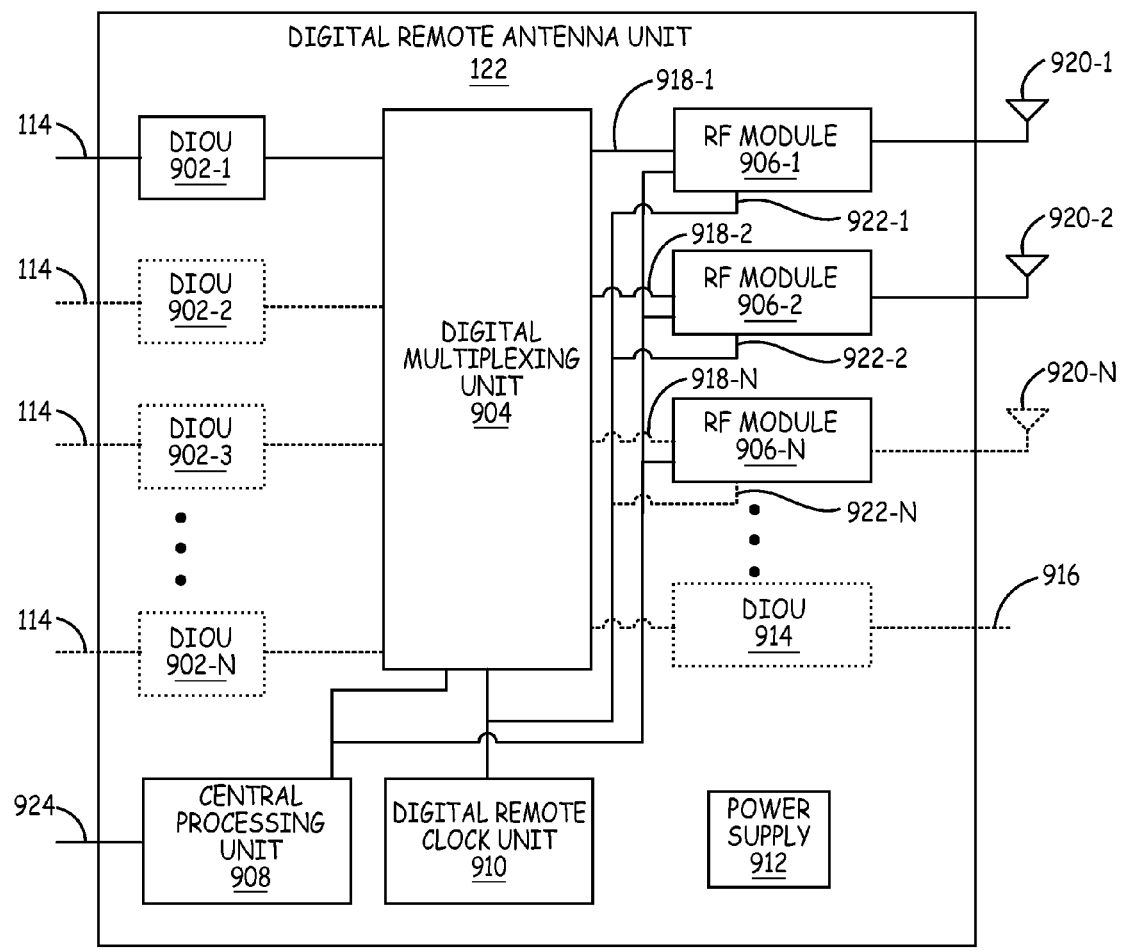
FIG. 9 is a block diagram of one embodiment of a digital remote antenna unit for the system of FIG. 8.

FIG. 9 is a block diagram of one embodiment of a digital remote antenna unit 122, such as digital remote antenna unit 122-1 of system 800. Digital remote antenna unit 122 includes at least one digital input-output unit (DIOU) 902, at least one digital multiplexing unit (DMU) 904, a first RF module 906-1 and a second RF module 906-2, at least one central processing unit (CPU) 908, at least one digital remote clock unit (DRCU) 910, and at least one power supply 912. In some embodiments, at least one digital input-output unit (DIOU) 914 is used to facilitate a digital output line 916. The digital output line 916 allows daisy-chaining multiple digital remote antenna units 122 together. The digital output line 916 of one digital remote antenna unit 122 can be coupled to the input of a DIOU 902 of another digital remote antenna unit 122. The digital output line 916 will be described in further detail below with regards to embodiments having daisy-chained digital remote antenna units 122.

Each digital remote antenna unit 122 communicates a third MIMO path and a fourth MIMO path with a master host unit 104 in the form of a time-multiplexed digital data stream containing N-bit words of digitized spectrum for the third MIMO path and the fourth MIMO path. The time-multiplexed digital data stream is received at the at least one DIOU 902 through at least one digital communication link 114. In the embodiment shown in FIG. 9, only one DIOU 902-1 is necessary if the digital remote antenna unit 122 is only coupled with a single upstream master host unit 104 (or single upstream digital expansion unit 110 as described above). DIOU 902-1 receives the time-multiplexed digital data stream from a master host unit 104 via a digital communication link 114 in an optical format. DIOU 902-1 converts the time-multiplexed digital data stream from the optical format to an electrical format and passes the time-multiplexed digital data stream onto the DMU 904. DIOU 902-2 through DIOU 902-N are optional. For example, in other embodiments, digital remote antenna unit 122 has multiple DIOUs 902 (DIOU 902-1 through DIOU 902-N) and is connected to multiple upstream master host units 104 or digital expansion units 110 through digital communication links 114. In other embodiments, digital remote antenna unit 122 is connected to digital expansion units 110 through DIOU 902. In some embodiments including multiple upstream connections, the digital remote antenna unit 122 selects one DIOU 902 to extract the clock signal from.

As noted above, the at least one DIOU 902 communicates the time-multiplexed digital data stream containing N-bit words of digitized spectrum representing the third and fourth MIMO paths to the DMU 904. In some embodiments, the first and third MIMO paths contain identical N-bit words of digitized spectrum in the downstream and the N-bit words of digitized spectrum in the first and third MIMO paths are combined at a master host unit 104 in the upstream. Similarly, in some embodiments, the second and fourth MIMO paths contain identical N-bit words of digitized spectrum in the downstream and the N-bit words of digitized spectrum in the second and fourth MIMO paths are combined at a master host unit 104 in the upstream. The DMU 904 demultiplexes N-bit words of digitized spectrum received from the at least one DIOU 902. The DMU 904 sends N-bit words of digitized spectrum representing the third MIMO path across communication link 918-1 to RF module 906-1. The DMU 904 further sends N-bit words of digitized spectrum representing the fourth MIMO path across communication link 918-2 to RF module 906-2. An exemplary RF module is described in further detail with reference to FIG. 10 below. Each RF module 906 is also coupled to the digital remote clock unit 910 by a communication link 922, such as communication link 922-1 coupling RF module 906-1 with the digital remote clock unit 910 and communication link 922-2 coupling RF module 906-2 with the digital remote clock unit 910.

The DMU 904 extracts the digital master reference clock signal from the data stream itself Because the data stream was synchronized with the digital master reference clock signal at a master host unit 104, it can be recovered from the data stream itself The extracted digital master reference clock signal is sent to the digital remote clock unit 910. The digital remote clock unit 910 receives the digital master reference clock signal extracted from the data stream received from a master host unit 104. The digital remote clock unit 910 communicates the digital master reference clock signal to various components of the digital remote antenna unit 122, including the DMU 904 and each RF module 906. Each DMU 904 uses the digital master reference clock signal to synchronize itself with the system 100. Each RF module receives the digital master reference clock signal from the digital remote clock unit 910 across a communication link 922 (i.e., communication link 922-1, communication link 922-2, and communication link 922-N). While each communication link 918 and communications link 922 are shown as separate lines in FIG. 7, in some embodiments a single multi-conductor cable is connected between the DMU 904 and each RF module 906. This multi-conductor cable includes both the communication link 918 and communications link 922 and carries the clock signals, data signals, control/management signals, etc.

In some embodiments, each DIOU 902 is selectable and configurable, so that one DIOU 902 can be selected to receive the digital master reference clock signal and other DIOUs 902 can be used to send the digital master reference clock signal upstream to other system components, such as secondary master host units, digital expansion units, hybrid expansion units, or other digital remote antenna units. Each DIOU 902 is not required to be synchronized to the other parts of the digital remote antenna unit 122 unless it performs some type of function that requires it to be synchronized. In one embodiment, the DIOU 902 performs the extraction of the digital master reference clock in which case it would be synchronized to the remainder of the hybrid expansion unit.

In the downstream, each RF module 906 receives N-bit words of digitized spectrum and outputs an RF signal that is transmitted across an air medium using at least one respective antenna 920. In the upstream, each RF module 906 receives RF signals received across an air medium using the at least one respective antenna 920 and outputs N-bit words of digitized spectrum to the DMU 904. In the digital remote antenna unit 122 shown in FIG. 9, RF module 906-1 converts between N-bit words of digitized spectrum and RF signals for the first MIMO path. Similarly, RF module 906-2 converts between N-bit words of digitized spectrum and RF signals for the second MIMO path. In other embodiments, at least one RF module 906 converts between N-bit words of digitized spectrum and RF signals for multiple bands. A different antenna element is used for each signal path in some example embodiments having multiple bands, such as embodiments having diversity channels or multiple signal branches used for smart antennas where signals overlap spectrally. In the digital remote antenna unit 122 shown in FIG. 9, each RF module 906 is connected to a separate respective antenna 920.

As noted above, some embodiments of digital remote antenna unit 122 include at least one DIOU 914 and at least one digital output line 916 that allow daisy-chaining multiple digital remote antenna units 122 together. In example embodiments, DIOU 914 is coupled to digital multiplexing unit 904. In the downstream, DIOU 914 converts the data stream coming from the DMU 904 from an electrical format to an optical format and outputs the data stream across digital output line 916. In the upstream, DIOU 914 converts the data stream coming across digital output line 916 from an optical format to an electrical format and passes the data stream onto the DMU 904. Thus, as described below, a plurality of digital remote antenna units 122 can be daisy-chained together using the digital output line 916 on at least one digital remote antenna unit 122.

CPU 908 is used to control each DMU 904 and each RF module 906. While the links between the CPU 908 and the DMU 904 and each RF module 906 are shown as separate links from the communication links 918 and the communications links 920, it can be part of a multi-conductor cable as described above. An input/output (I/O) line 924 coupled to CPU 908 is used for network monitoring and maintenance. Typically, I/O line 924 is an Ethernet port used for external communication with the system. Power supply 912 is used to power various components within digital remote antenna unit 122.

Figure 10:
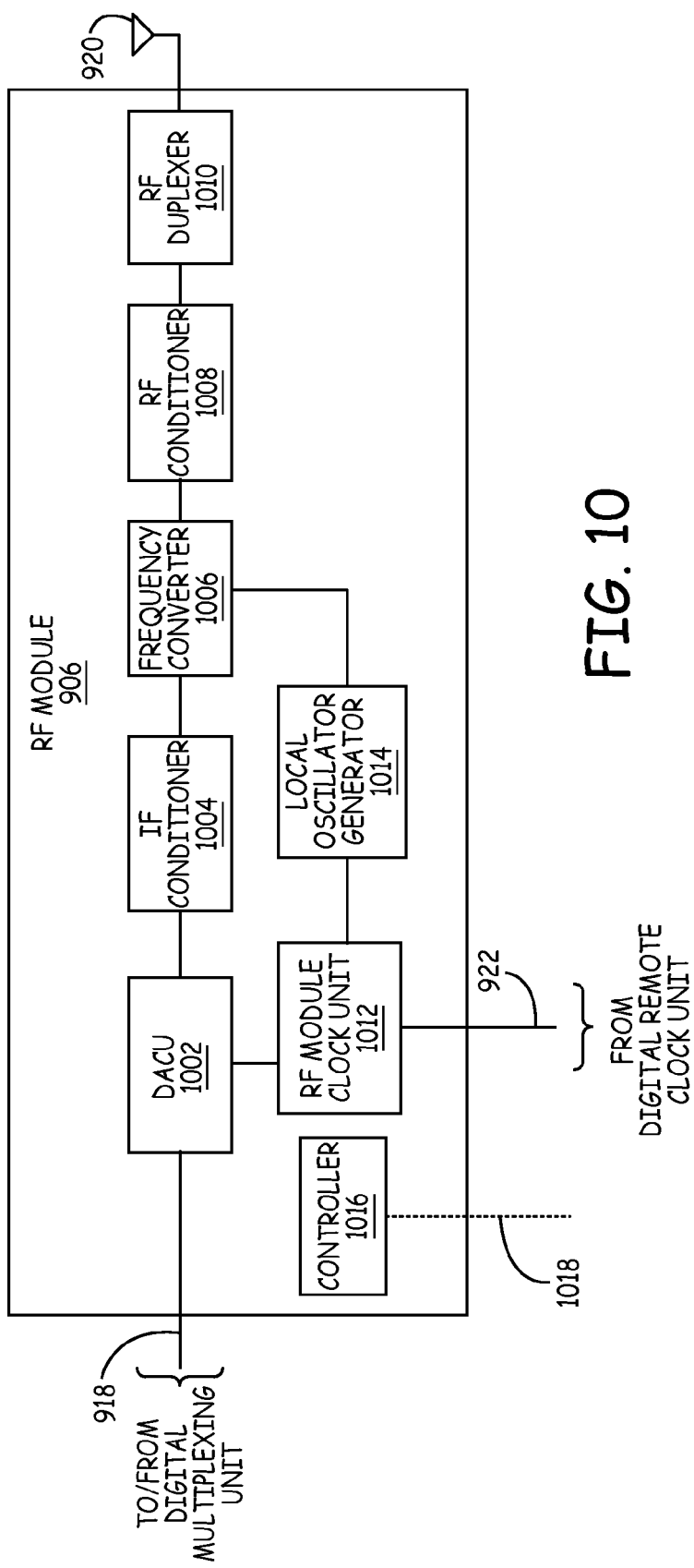
FIG. 10 is a block diagram of one embodiment of a RF module for the digital remote antenna unit of FIG. 9.

FIG. 10 is a block diagram of one embodiment of a RF module 906 for digital remote antenna unit 122. The RF module 906 includes a digital-analog conversion unit (DACU) 1002, an IF conditioner 1004, a frequency converter 1006, a RF conditioner 1008, a RF duplexer 1010, a RF module clock unit, a local oscillator generator 1014, and a controller 1016. While the RF module 906 is described as a separate component, in some example embodiments, some or all of the components included in RF module 906 are integrated directly in digital remote antenna unit 122. In other embodiments, other components are used to perform the same or similar functions to the components of RF module 906 described below.

The DACU 1002 is connected to a communication link 918, where it communicates N-bit words of digitized spectrum with the DMU 904. The DACU 1002 is also connected to the RF module clock unit 1012, where it receives a digital master reference clock signal from the digital remote clock unit 910 of the digital remote antenna unit 122 across a communication link 922. In other embodiments, DACU 1002 can also communicate to or from other components of the digital remote antenna unit 122. The DACU 1002 converts between the N-bit words of digitized spectrum and an analog intermediate frequency (IF) spectrum using the digital master reference clock signal. In the downstream, the analog intermediate frequency (IF) is passed through the IF conditioner 1004 that filters, amplifies, and attenuates the IF spectrum prior to frequency up-conversion. In the upstream, the analog intermediate frequency (IF) is passed through the IF conditioner 1004 that filters, amplifies, and attenuates the IF spectrum prior to analog to digital conversion by the DACU 1002.

The RF module clock unit 1012 receives the digital master reference clock signal across the communication link 922 and distributes the signal to the DACU 1002. The RF module clock unit 1012 also generates an analog domain reference clock signal based on the digital master reference clock signal. This analog domain reference clock signal is used to synchronize analog components in the RF module 906. In the embodiment of RF module 906 shown in FIG. 10, the RF module clock unit 1012 generates the analog domain reference clock signal by running the digital master reference clock signal through a phase locked loop circuit. The generated analog domain reference clock signal is then passed onto the local oscillator generator 1014. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is sent to the local oscillator generator 1014.

The frequency converter 1006 converts between IF spectrum and RF spectrum. The frequency converter 1006 is connected to the local oscillator generator 1014. The local oscillator generator 1014 receives the analog domain reference clock from the RF module clock unit 1012. In example embodiments, the analog domain reference clock signal is first refined using a band pass filter or other appropriate filter. In other embodiments, the analog domain reference clock signal drives a phase locked loop to generate a refined reference clock signal. In the example shown in FIG. 10, the local oscillator generator 1024 generates two local oscillator frequencies for each of the carrier signals of the band serviced by the RF module 906. A first local oscillator frequency is used for downlink data and a second local oscillator frequency is used for the uplink data. While the RF module 906 is described as only servicing a single band, other embodiments include greater numbers of bands where greater numbers of oscillator signals are created by the local oscillator generator 1014. For example, some embodiments may require diversity, so that two uplinks are needed for each downlink and three local oscillators would need to be generated for each band.

The frequency converter 1006 uses the downstream mixing frequency to convert the downstream IF signal to a downstream RF signal. The downstream RF signal is passed onto the RF conditioner 1008, which performs RF gain adjustment and filtering on the downstream RF signal. The RF conditioner 1008 passes the downstream RF signal to the RF duplexer 1010, where the downstream RF signal is combined onto the same medium with the upstream RF signal. In example RF module 906, the RF signals are transmitted and received across an air medium using a single antenna 920.

In the upstream, antenna 920 receives the RF signal and passes it onto the RF duplexer 1010, where the upstream RF and downstream RF signals are separated onto different signal lines. The upstream RF signal is then passed to the RF conditioner 1008, which performs gain adjustment and filtering on the upstream RF signal. Finally, the upstream RF signal is passed to frequency converter 1006, which frequency converts the upstream RF signal into an upstream IF signal using the upstream mixing frequency generated by the local oscillator generator 1014.

Each RF module 906 of example digital remote antenna unit 122 uses a separate antenna 920. In other embodiments, RF diplexers are implemented downstream of multiple RF modules 906, thereby allowing multiple RF bands to use a single antenna. In other embodiments, multiple antennas are used for each RF module 906. For example, in other embodiments, the downstream signals are transmitted from one antenna and the upstream signals are received from another antenna. In embodiments with these type of alternative antenna configurations, the requirements and design of the RF duplexers and any necessary RF diplexers will vary to meet the requirements of the antenna configuration.

While the frequency conversion described above is a two step process between digital and an IF analog signal and then between the IF analog signal and an RF analog signal, in other embodiments, a direct conversion occurs between the digital signals received on communication link 918 and the RF signals output across antenna 920. In such embodiments, the functionality of the DACU 1002, the IF conditioner 1004, and frequency converter 1006 may be combined or replaced with other appropriate components.

The controller 1016 uses control and management signals received over a communication link 1018 to control and manage various components of the RF module 906. In particular, the control and management signals are used by the controller 1016 to control and manage the gain in the IF conditioner 1004. Adjustments may be made based on temperature changes and other dynamic factors. While communication link 1018 is shown as a separate communication link, in some embodiments the communication link 1018 is combined with the communication link 918 using a multi-conductor cable as described above with reference to FIG. 9. In such embodiments, the multi-conductor cable couples the digital multiplexing unit 904 with each RF module 906 and the control and management messages are communicated over a pair of conductors in this cable. In other example embodiments, the multi-conductor cable is a generic communication link that combines the communication link 918, the communication link 1018, and the communication link 922 into a single cable that interfaces each RF module 906 with the digital multiplexing unit 904. The control signals are also used for the configuration of the subsequent frequency converter 1006 and RF conditioner 1008. In example RF module 906, all of the components of RF module 906 are powered by the power supply 912 of the digital remote antenna unit 122. In other embodiments, a separate power supply is included in each RF module 906 and is used to power the various components of RF module 906. In other embodiments, signal line power extraction is used to supply power to the RF module 906.

As discussed above with reference to the digital remote antenna unit 122 shown in FIG. 9, a first RF module 906-1 is used for the first MIMO path and a second RF module 906-2 is used for the second MIMO path. In other embodiments, there are additional MIMO paths and/or additional bands and thusly additional RF modules.

Figure 11:
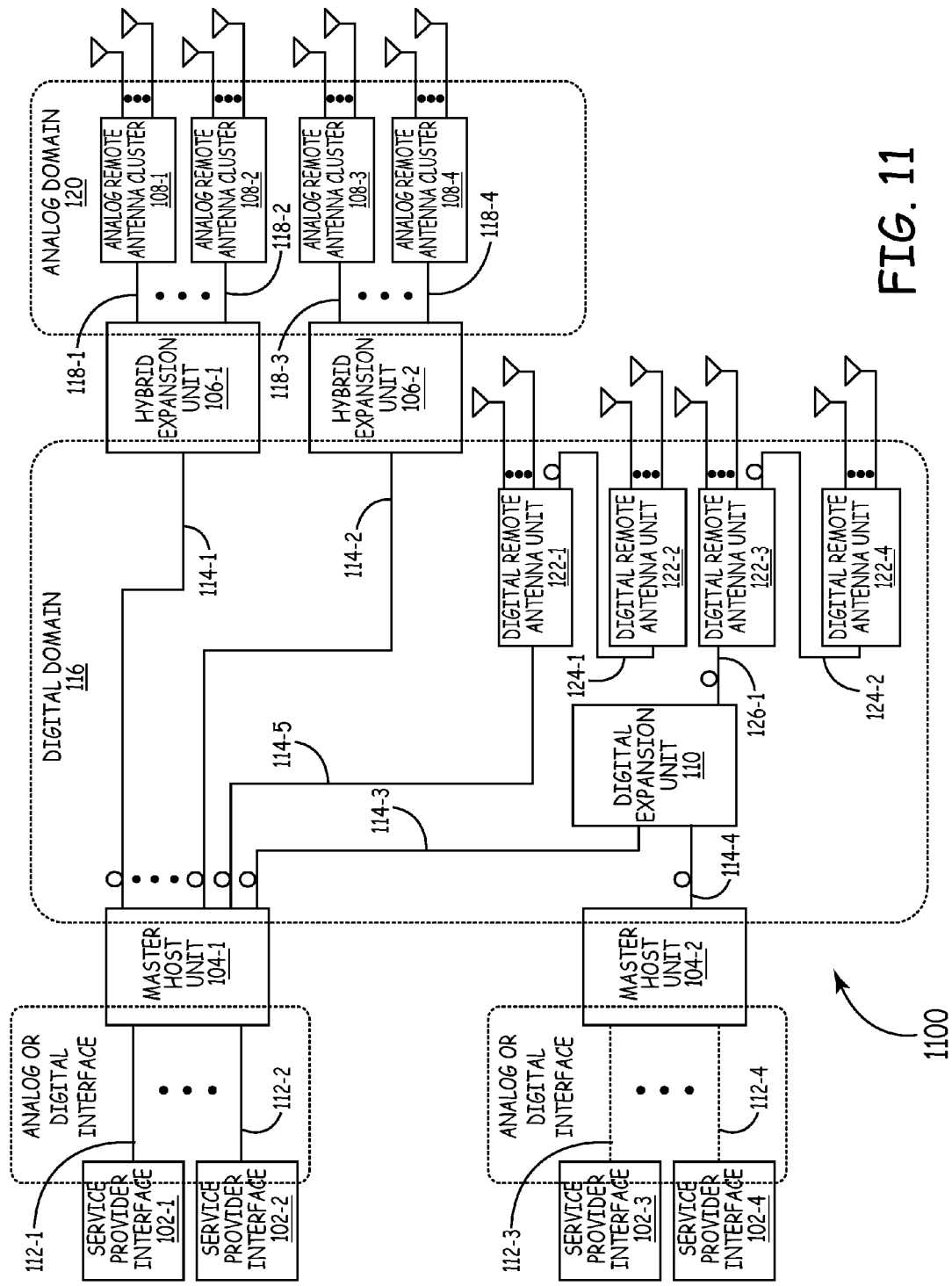
FIG. 11 is a block diagram of another embodiment of a system for providing wireless coverage into a substantially enclosed environment.

FIG. 11 is a block diagram of another embodiment of a system 1100 for providing wireless coverage into a substantially enclosed environment. System 1100 shows a more complicated topology where the systems and methods described herein are applied. The system 1100 includes some of the same components as system 800, including a master host unit 104-1, a hybrid expansion unit 106-1, an analog remote antenna cluster 108-1, and a digital remote antenna unit 122-1. The system 1100 also communicates a first MIMO path with a first service provider interface 102-1 and a second MIMO path with a second service provider interface 102-2. The differences between system 800 and system 1100 are that system 1100 includes additional analog remote antenna clusters 108-2, 108-3, and 108-4, hybrid expansion unit 106-2, digital expansion unit 110, digital remote antenna units 122-2, 122-3, and 122-4, service provider interfaces 102-3 and 102-4, and master host unit 104-2.

Analog remote antenna cluster 108-1 is connected to hybrid expansion unit 106-1 through analog communication link 118-1 and analog remote antenna cluster 108-2 is connected to hybrid expansion unit 106-1 through analog communication link 118-2. Hybrid expansion unit 106-2 is connected to master host unit 104-1 through digital communication link 114-2. Analog remote antenna cluster 108-3 is connected to hybrid expansion unit 106-2 through analog communication link 118-3 and analog remote antenna cluster 108-4 is connected to hybrid expansion unit 106-2 through analog communication link 118-4.

As in system 800, digital remote antenna unit 122-1 is connected to master host unit 104-1 through digital communication link 114-5. Digital remote antenna unit 122-2 is daisy-chain connected to digital remote antenna unit 122-1 through digital remote antenna unit connection link 124-1.

Digital expansion unit 110 is connected to master host unit 104-1 through digital communication link 114-3. Digital expansion unit 110 is also connected to master host unit 104-2 through digital communication link 114-4. Master host unit 104-2 is connected to service provider interface 102-3 through analog communication interface 112-3 and is connected to service provider interface 102-4 through analog communication interface 112-4. Digital remote antenna unit 122-3 is connected to digital expansion unit 110 through digital expansion unit communication link 126-1. Digital remote antenna unit 122-4 is daisy-chain connected to digital remote antenna unit 122-3 by digital remote antenna unit connection link 124-2.

In the embodiments of the systems described above, the various components, including master host unit(s) 104, hybrid expansion unit(s) 106, analog remote antenna cluster(s) 108, digital remote unit(s) 122, and digital expansion unit(s) 110, are shown as separate components. In some other example embodiments, some of these components can be combined into the same physical housing or structure and/or functionality can be ported from one component to another.

Figure 12:
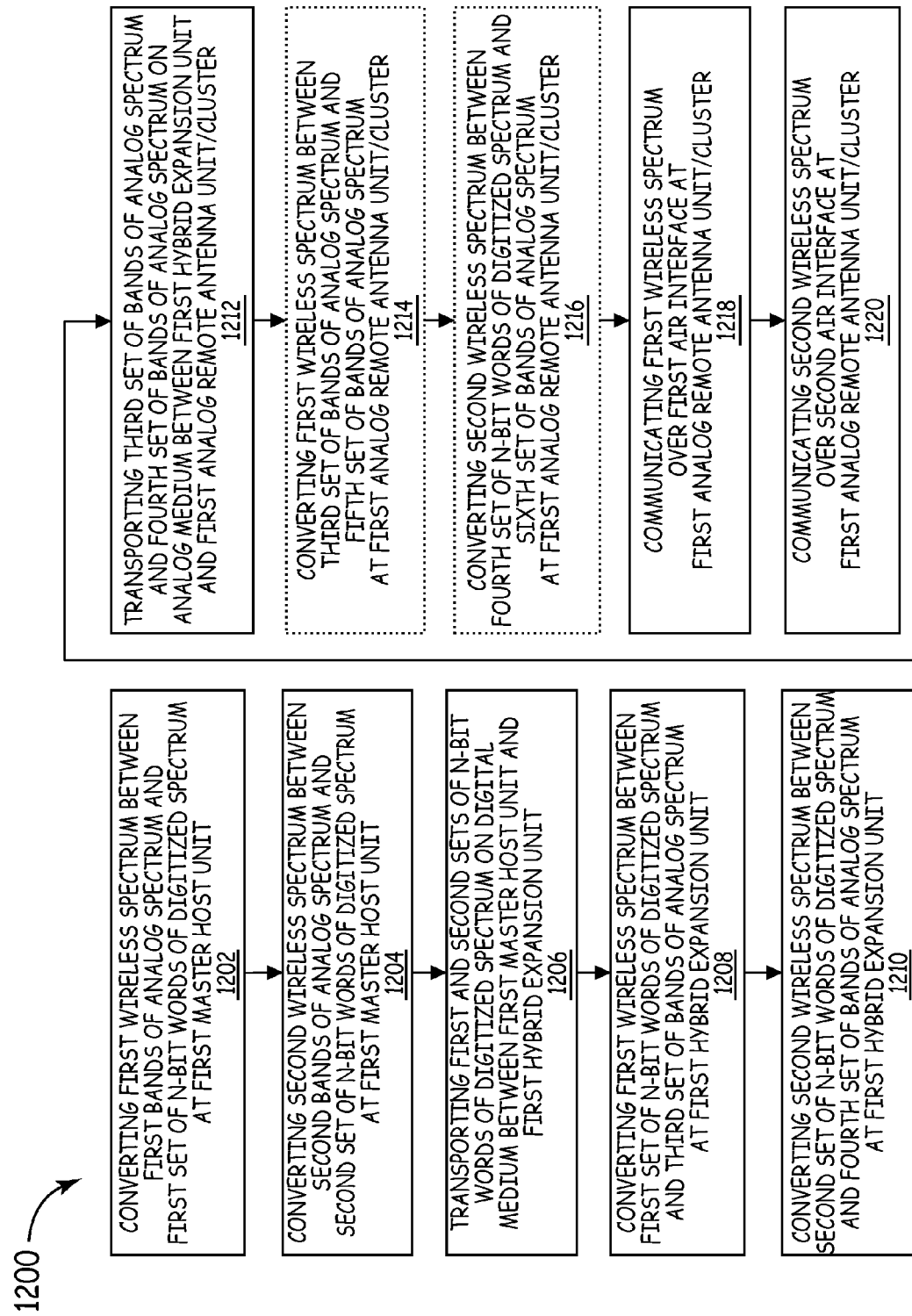
FIG. 12 is a flow diagram of an embodiment of a method of communicating multiple-input multiple-output (MIMO) signals through a distributed antenna system.

FIG. 12 shows an exemplary embodiment of a method flow diagram for a method of communicating multiple-input multiple-output (MIMO) signals through a hybrid distributed antenna system, labeled method 1200. The method 1200 begins at block 1202, where first wireless spectrum is converted between first bands of analog spectrum and a first set of N-bit words of digitized spectrum at a first master host unit, such as master host unit 104 described above. At block 1204, second wireless spectrum is converted between second bands of analog spectrum and a second set of N-bit words of digitized spectrum at the first master host unit. At block 1206, the first and second sets of N-bit words of digitized spectrum are transported on a digital medium between the first master host unit and a first hybrid expansion unit, such as hybrid expansion unit 106-1.

At block 1208, the first wireless spectrum is converted between a first set of N-bit words of digitized spectrum and a third set of bands of analog spectrum at the first hybrid expansion unit. At block 1210, the second wireless spectrum is converted between a second set of N-bit words of digitized spectrum and a fourth set of bands of analog spectrum at the first hybrid expansion unit. At block 1212, the third and fourth sets of bands of analog spectrum are transported on an analog medium between the first hybrid expansion unit and a first analog remote antenna unit/cluster, such as analog remote antenna unit 404-1 or analog remote antenna cluster 108-1 described in detail above with reference to FIG. 4.

At optional block 1214, the first wireless spectrum is converted between the third set of bands of analog spectrum and a fifth set of bands of analog spectrum at the first analog remote antenna unit/cluster. At optional block 1216, the second wireless spectrum is converted between the fourth set of bands of analog spectrum and sixth set of bands of analog spectrum at the first analog remote antenna unit/cluster.

At block 1218, the first wireless spectrum is communicated over a first air interface at the first analog remote antenna unit/cluster. At block 1220, the second wireless spectrum is communicated over a second air interface at the first analog remote antenna unit/cluster.

Figure 13:
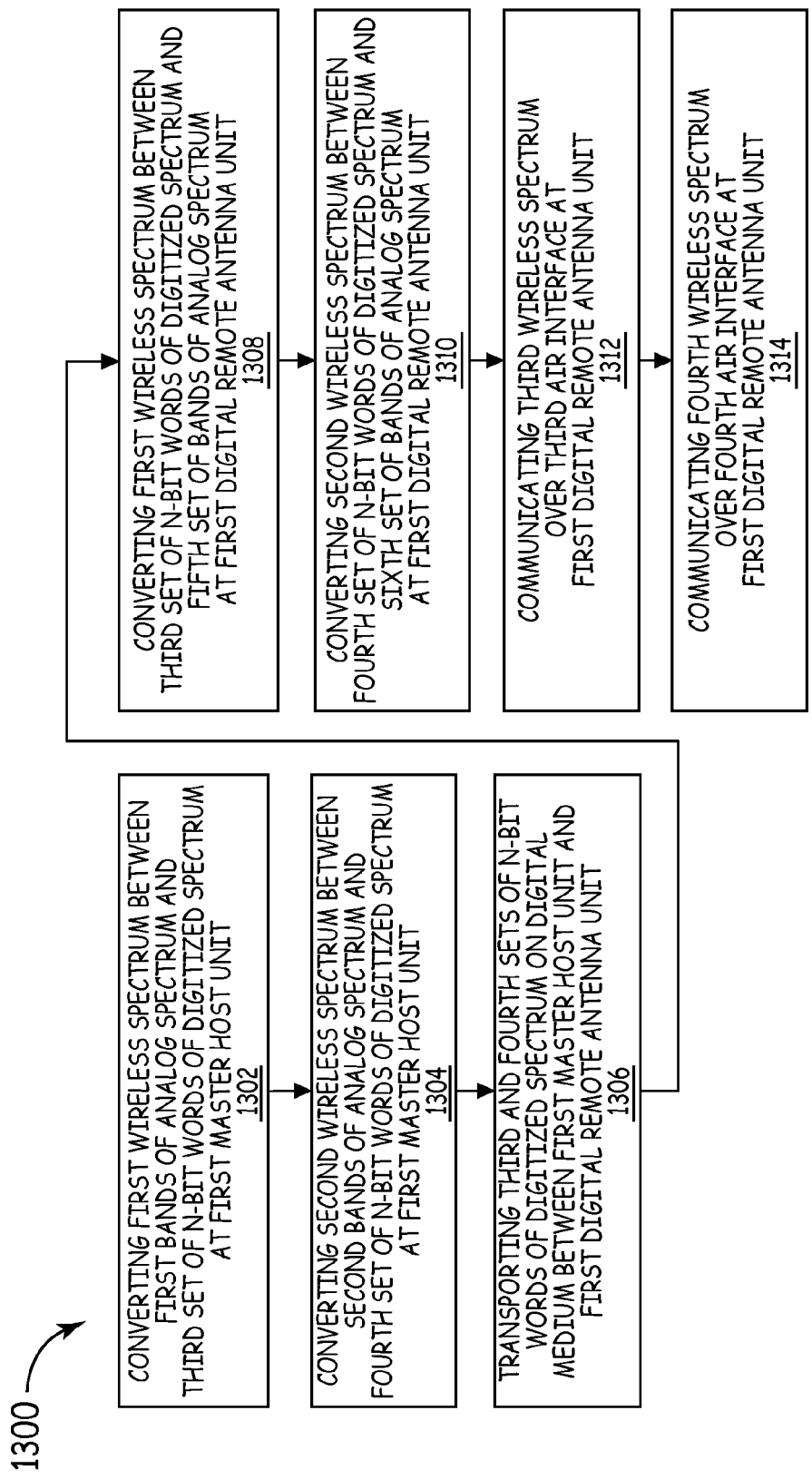
FIG. 13 is a flow diagram of another embodiment of a method of communicating multiple-input multiple-output (MIMO) signals through a distributed antenna system.

FIG. 13 shows an exemplary embodiment of a method flow diagram for a method of communicating multiple-input multiple-output (MIMO) signals through a hybrid distributed antenna system having a digital remote unit, labeled method 1300. The method 1300 begins at block 1302, where first wireless spectrum is converted between first bands of analog spectrum and a third set of N-bit words of digitized spectrum at a first master host unit, such as master host unit 104 described above. At block 1304, second wireless spectrum is converted between second bands of analog spectrum and a fourth set of N-bit words of digitized spectrum at the first master host unit. At block 1306, the first and second sets of N-bit words of digitized spectrum are transported on a digital medium between the first master host unit and a first digital remote antenna unit, such as digital remote antenna unit 122-1.

At block 1308, the first wireless spectrum is converted between a third set of N-bit words of digitized spectrum and a fifth set of bands of analog spectrum at the first digital remote antenna unit. At block 1310, the second wireless spectrum is converted between a fourth set of N-bit words of digitized spectrum and a sixth set of bands of analog spectrum at the first digital remote antenna unit. At block 1312, third wireless spectrum is communicated over a third air interface at the first digital remote antenna unit. At block 1314, fourth wireless spectrum is communicated over a fourth air interface at the first digital remote antenna unit.

In some embodiments, method 1200 and method 1300 are combined into one method of communicating MIMO signals through a hybrid distributed antenna system, having both digital and analog remote units. In some of these embodiments, the first set of N-bit words is the same as the third set of N-bit words in the downstream and the second set of N-bit words is the same as the fourth set of N-bit words in the downstream. In addition, in some of these embodiments, the first set of N-bit words and the third set of N-bit words are combined in the upstream before being sent to the first service provider interface. Likewise, in some of these embodiments, the second set of N-bit words and the fourth set of N-bit words are combined in the upstream before being sent to the second service provider interface.

Figure 14:
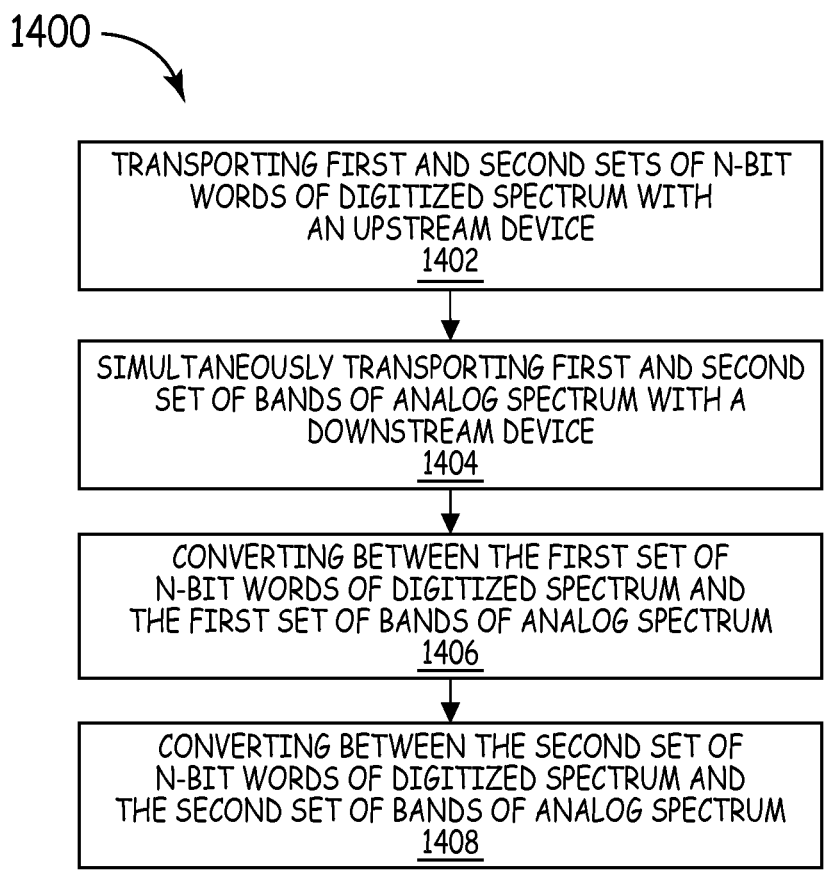
FIG. 14 is a flow diagram of an embodiment of a method of converting and transporting multiple-input multiple-output (MIMO) signals at a hybrid expansion unit in a distributed antenna system.

FIG. 14 shows an exemplary embodiment of a method flow diagram for a method of converting and transporting multiple-input multiple-output (MIMO) signals at a hybrid expansion unit in a distributed antenna system, labeled method 1400. The method 1400 begins at block 1402, where first and second sets of N-bit words of digitized spectrum are transported with an upstream device. At block 1404, first and second sets of bands of analog spectrum are simultaneously transported with a downstream device. At block 1406, the first set of N-bit words of digitized spectrum are converted to and from the first set of bands of analog spectrum. At block 1408, the second set of N-bit words of digitized spectrum are converted to and from the second set of bands of analog spectrum.

What is claimed is:

1. A communication system for distributing a multiple-input multiple-output (MIMO) signal having a first MIMO path and a second MIMO path, comprising:
a first master host unit adapted to communicate the first MIMO path with a first service provider interface using first digital signals, the first master host unit further adapted to communicate the second MIMO path with a second service provider interface using second digital signals;
a plurality of digital communication links coupled to the first master host unit, wherein the first master host unit is further adapted to communicate the first MIMO path over the plurality of digital communication links using first N-bit words of digitized spectrum, wherein the first master host unit is further adapted to communicate the second MIMO path over the plurality of digital communication links using second N-bit words of digitized spectrum;
wherein the first master host unit is further adapted to interface the first MIMO path between the first digital signals and the first N-bit words of digitized spectrum;
wherein the first master host unit is further adapted to interface the second MIMO path between the second digital signals and the second N-bit words of digitized spectrum;
a first hybrid expansion unit communicatively coupled to the first master host unit by a first digital communication link of the plurality of digital communication links and adapted to communicate the first MIMO path using the first N-bit words of digitized spectrum and the second MIMO path using the second N-bit words of digitized spectrum with the first master host unit across the first digital communication link, the first hybrid expansion unit further adapted to convert the first MIMO path between the first N-bit words of digitized spectrum and a first set of bands of analog spectrum, the first hybrid expansion unit further adapted to convert the second MIMO path between the second N-bit words of digitized spectrum and a second set of bands of analog spectrum;
a first analog communication link coupled to the first hybrid expansion unit, wherein the first hybrid expansion unit is further adapted to communicate the first MIMO path using the first set of bands of analog spectrum and the second MIMO path using the second set of bands of analog spectrum across the first analog communication link;
a first analog remote antenna unit communicatively coupled to the first hybrid expansion unit by the first analog communication link and adapted to communicate the first MIMO path using the first set of bands of analog spectrum and the second MIMO path using the second set of bands of analog spectrum with the first hybrid expansion unit across the first analog communication link, the first analog remote antenna unit further adapted to communicate the first MIMO path using first wireless signals over a first air interface using a first antenna, and the first analog remote antenna unit further adapted to communicate the second MIMO path using second wireless signals over a second air interface using a second antenna; and
wherein the first MIMO path between the first master host unit and the first antenna is distinct from the second MIMO path between the first master host unit and the second antenna.

2. The system of claim 1, wherein the first master host unit is adapted to interface the first MIMO path between the first digital signals and the first N-bit words of digitized spectrum by passing the first MIMO path between the first digital signals and the first N-bit words of digitized spectrum as is without reformatting; and
wherein the first master host unit is adapted to interface the second MIMO path between the second digital signals and the second N-bit words of digitized spectrum by passing the second MIMO path between the second digital signals and the second N-bit words of digitized spectrum as is without reformatting.

3. The system of claim 1, wherein the first master host unit is adapted to interface the first MIMO path between the first digital signals and the first N-bit words of digitized spectrum by converting the first MIMO path between the first digital signals and the first N-bit words of digitized spectrum by reformatting digital data between the first digital signals and the first N-bit words of digitized spectrum; and
wherein the first master host unit is adapted to interface the second MIMO path between the second digital signal and the second N-bit words of digitized spectrum by converting the second MIMO path between the second digital signals and the second N-bit words of digitized spectrum by reformatting digital data between the second digital signal and the second N-bit words of digitized spectrum.

4. The system of claim 1, wherein the master host unit is adapted to communicate the first MIMO path with the first service provider interface using first digital signals across at least a first digital communication media; and wherein the master host unit is adapted to communicate the second MIMO path with the second service provider interface using second digital signals across at least a second digital communication media.

5. The system of claim 4, wherein the at least a first digital communication media is the same as the at least a second digital communication media.

6. The system of claim 1, wherein the first wireless signals equal the first digital signals and the second wireless signals equal the second digital signals.

7. The system of claim 1, wherein the first set of bands of analog spectrum occupy a first frequency range and the second set of bands of analog spectrum occupy a second frequency range.

8. The system of claim 7, wherein the first frequency range and the second frequency range do not overlap.

9. The system of claim 1, wherein the first analog remote antenna unit is part of a first analog remote antenna cluster that includes:

a master analog remote antenna unit adapted to communicate the first MIMO path using the first set of bands of analog spectrum and the second MIMO path using the second set of bands of analog spectrum with the first hybrid expansion unit across the first analog communication link; and wherein the master analog remote antenna unit distributes the first MIMO path using the first set of bands of analog spectrum and the second MIMO path using the second set of bands of analog spectrum to the first analog remote antenna unit.

10. The system of claim 1, wherein the master analog remote antenna unit is the same as the first analog remote antenna unit.

11. The system of claim 1, wherein the first service provider interface and the second service provider interface are multiple-input multiple-output interfaces.

12. The system of claim 1, wherein the first N-bit words of digitized spectrum and the second N-bit words of digitized spectrum are communicated as a time multiplexed data stream between the first master host unit and the first hybrid expansion unit.

13. The system of claim 1, further comprising:

a first digital remote antenna unit communicatively coupled to the first master host unit by a second digital communication link of the plurality of digital communication links and adapted to communicate a third MIMO path using third N-bit words of digitized spectrum and a fourth MIMO path using fourth N-bit words of digitized spectrum with the first master host unit across the second digital communication link, the first digital remote antenna unit is further adapted to communicate the third MIMO path using third wireless signals over a third air interface using a third antenna, and the first digital remote antenna unit is further adapted to communicate the fourth MIMO path using fourth wireless signals over a fourth air interface using a fourth antenna;

wherein the first master host unit is further adapted to interface the third MIMO path between the first digital signals and the third N-bit words of digitized spectrum; and wherein the first master host unit is further adapted to interface the fourth MIMO path between the first digital signals and the fourth N-bit words of digitized spectrum.

14. The system of claim 13, wherein the third MIMO path is equal to the first MIMO path; and wherein the fourth MIMO path is equal to the second MIMO path.

15. The system of claim 13, wherein the first N-bit words of digitized spectrum equal the third N-bit words of digitized spectrum in the downstream; and wherein the second N-bit words of digitized spectrum equal the fourth N-bit words of digitized spectrum in the downstream.

16. The system of claim 13, wherein the third wireless signals are associated with the first digital signals and the fourth wireless signals are associated with the second digital signals.

17. The system of claim 13, wherein the third N-bit words of digitized spectrum and the fourth N-bit words of digitized spectrum are communicated as a time multiplexed data stream between the first master host unit and the first digital remote unit.

18. A method for distributing a multiple-input multiple-output (MIMO) signal having a first MIMO path and a second MIMO path, the method comprising:

interfacing the first MIMO path between a first digital signals and first N-bit words of digitized spectrum at a first master host unit;

interfacing the second MIMO path between a second digital signals and second N-bit words of digitized spectrum at a first master host unit;

transporting the first MIMO path using first N-bit words of digitized spectrum and the second MIMO path using second N-bit words of digitized spectrum on a first digital medium between the first master host unit and a first hybrid expansion unit;

converting the first MIMO path between the first N-bit words of digitized spectrum and a first set of bands of analog spectrum at the first hybrid expansion unit;

converting the second MIMO path between the second N-bit words of digitized spectrum and a second set of bands of analog spectrum at the first hybrid expansion unit;

transporting the first MIMO path using the first set of bands of analog spectrum and the second MIMO path using the second set of bands of analog spectrum on a first analog medium between the first hybrid expansion unit and a first analog remote antenna unit;

communicating the first MIMO path using first wireless spectrum over a first air interface at the first analog remote antenna unit using a first antenna;

communicating the second MIMO path using second wireless spectrum over a second air interface at the first analog remote antenna unit using a second antenna; and wherein the first MIMO path between the first master host unit and the first antenna is distinct from the second MIMO path between the first master host unit and the second antenna.

19. The method of claim 18, wherein interfacing the first MIMO path between the first digital signals and the first N-bit words of digitized spectrum at the master host unit includes passing the first MIMO path between the first digital signal and the first N-bit words of digitized spectrum as is without reformatting; and wherein interfacing the second MIMO path between the second digital signals and the second N-bit words of digitized spectrum at the master host unit includes passing the second MIMO path between the second digital signal and the second N-bit words of digitized spectrum as is without reformatting.

20. The method of claim 18, wherein interfacing the first MIMO path between the first digital signals and the first N-bit words of digitized spectrum at the master host unit includes converting the first MIMO path between the first digital signals and the first N-bit words of digitized spectrum at the master host unit; and wherein interfacing the second MIMO path between the second digital signals and the second N-bit words of digitized spectrum at the master host unit includes converting the second MIMO path between the second digital signal and the second N-bit words of digitized spectrum at the first master host unit.

21. The method of claim 18, further comprising:

communicating the first MIMO path between a first service provider interface and the first master host unit using first digital signals across at least a first digital communication media; and communicating the second MIMO path between a second service provider interface and the first master host unit using second digital signals across at least a second digital communication media.

22. The method of claim 21, wherein the at least a first digital communication media is the same as the at least a second digital communication media.

23. The method of claim 18, wherein the first wireless signals equal the first digital signals and the second wireless signals equal the second digital signals.

24. The method of claim 18, wherein the first set of bands of analog spectrum occupy a first frequency range and the second set of bands of analog spectrum occupy a second frequency range.

25. The method of claim 24, wherein the first frequency range and the second frequency range do not overlap.

26. The method of claim 25, wherein the first frequency range and the second frequency range are at intermediate frequencies.

27. The method of claim 18, wherein the first MIMO path is communicated as a third set of bands of analog spectrum over the first air interface at the first analog remote antenna unit using the first antenna; and wherein the second MIMO path is communicated as a fourth set of bands of analog spectrum over the second air interface at the second analog remote antenna unit using the second antenna.

28. The method of claim 27, wherein the third set of bands of analog spectrum is equivalent to the first digital signals and wherein the fourth set of bands of analog spectrum is equivalent to the second digital signals.

29. The method of claim 18, wherein the first N-bit words of digitized spectrum and the second N-bit words of digitized spectrum are communicated as a time multiplexed data stream between the first master host unit and the first hybrid expansion unit.

30. The method of claim 18, further comprising:

interfacing a third MIMO path between the first digital signals and third N-bit words of digitized spectrum at the first master host unit;

interfacing a fourth MIMO path between the second digital signals and fourth N-bit words of digitized spectrum at the first master host unit;

transporting the third MIMO path using the third N-bit words of digitized spectrum and the fourth MIMO path using the fourth N-bit words of digitized spectrum on a second digital medium between the first master host unit and a first digital remote antenna unit;

communicating the third MIMO path using third wireless spectrum over a third air interface at the first digital remote antenna unit using a third antenna;

communicating the fourth MIMO path using fourth wireless spectrum over a fourth air interface at the first digital remote antenna unit using a fourth antenna; and wherein the third MIMO path between the first master host unit and the third antenna is distinct from the fourth MIMO path between the first master host unit and the fourth antenna.

31. The method of claim 30, wherein the third MIMO path is equal to the first MIMO path; and wherein the fourth MIMO path is equal to the second MIMO path.

32. The method of claim 30, wherein interfacing the first MIMO path between the first digital signals and the first N-bit words of digitized spectrum at the first master host unit and interfacing the third MIMO path between the first digital signals and the third N-bit words of digitized spectrum at the first master host unit are the same operation; and wherein interfacing the second MIMO path between the second digital signals and the second N-bit words of digitized spectrum at the first master host unit and interfacing the fourth MIMO path between the second digital signals and the fourth N-bit words of digitized spectrum at the first master host unit are the same operation.

33. The method of claim 30, wherein the third wireless signals equal the first digital signals and the fourth wireless signals equal the second digital signals.

34. The method of claim 30, wherein the third N-bit words of digitized spectrum and the fourth N-bit words of digitized spectrum are communicated as a time multiplexed data stream between the first master host unit and the first digital remote antenna unit.

35. A communication system for distributing a multiple-input multiple-output (MIMO) signal having a first MIMO path and a second MIMO path, comprising:

a first master host unit adapted to communicate the first MIMO path with a first service provider interface using first digital signals, the first master host unit further adapted to communicate the second MIMO path with a second service provider interface using second digital signals;

a plurality of digital communication links coupled to the first master host unit, wherein the first master host unit is further adapted to communicate the first MIMO path over the plurality of digital communication links using first N-bit words of digitized spectrum, wherein the first master host unit is further adapted to communicate the second MIMO path over the plurality of digital communication links using second N-bit words of digitized spectrum;

wherein the first master host unit is further adapted to convert the first MIMO path between the first digital signals and the first N-bit words of digitized spectrum;

wherein the first master host unit is further adapted to convert the second MIMO path between the second digital signals and the second N-bit words of digitized spectrum;

a first hybrid expansion unit communicatively coupled to the first master host unit by a first digital communication link of the plurality of digital communication links and adapted to communicate the first MIMO path using the first N-bit words of digitized spectrum and the second MIMO path using the second N-bit words of digitized spectrum with the first master host unit across the first digital communication link, the first hybrid expansion unit further adapted to convert the first MIMO path between the first N-bit words of digitized spectrum and a first set of bands of analog spectrum, the first hybrid expansion unit further adapted to convert the second MIMO path between the second N-bit words of digitized spectrum and a second set of bands of analog spectrum;

a first analog communication link coupled to the first hybrid expansion unit, wherein the first hybrid expansion unit is further adapted to communicate the first MIMO path using the first set of bands of analog spectrum and the second MIMO path using the second set of bands of analog spectrum across the first analog communication link;

a first analog remote antenna unit communicatively coupled to the first hybrid expansion unit by the first analog communication link and adapted to communicate the first MIMO path using the first set of bands of analog spectrum and the second MIMO path using the second set of bands of analog spectrum with the first hybrid expansion unit across the first analog communication link, the first analog remote antenna unit further adapted to communicate the first MIMO path using first wireless signals over a first air interface using a first antenna, and the first analog remote antenna unit further adapted to communicate the second MIMO path using second wireless signals over a second air interface using a second antenna; and wherein the first MIMO path between the first master host unit and the first antenna is distinct from the second MIMO path between the first master host unit and the second antenna.

36. The system of claim 35, wherein the master host unit is adapted to communicate the first MIMO path with the first service provider interface using first digital signals across at least a first digital communication media; and wherein the master host unit is adapted to communicate the second MIMO path with the second service provider interface using second digital signals across at least a second digital communication media.

37. The system of claim 36, wherein the at least a first digital communication media is the same as the at least a second digital communication media.

\* \* \* \* \*